United States Patent [19]

Takeuchi

[11] Patent Number: 5,526,522
[45] Date of Patent: Jun. 11, 1996

[54] AUTOMATIC PROGRAM GENERATING SYSTEM USING RECURSIVE CONVERSION OF A PROGRAM SPECIFICATION INTO SYNTACTIC TREE FORMAT AND USING DESIGN KNOWLEDGE BASE

[75] Inventor: Hiroshi Takeuchi, Tokyo, Japan

[73] Assignee: NEC Corporation, Tokyo, Japan

[21] Appl. No.: 847,962

[22] Filed: Mar. 9, 1992

[30] Foreign Application Priority Data

Mar. 8, 1991 [JP] Japan ................................ 3-069135

[51] Int. Cl.[6] ........................................................ G06F 9/45
[52] U.S. Cl. .................. 395/700; 364/280.4; 364/972.3; 364/973; 364/274.1; 364/274.3; 364/274.5; 395/922
[58] Field of Search ...................... 395/700; 364/DIG. 1, 364/DIG. 2

[56] References Cited

U.S. PATENT DOCUMENTS

| | | | |
|---|---|---|---|
| 4,398,249 | 8/1983 | Pardo et al. | 395/700 |
| 4,686,623 | 8/1987 | Wallace | 395/700 |
| 4,734,854 | 3/1988 | Afshar | 395/700 |
| 4,853,873 | 8/1989 | Tsuji et al. | 395/77 |
| 5,084,813 | 1/1992 | Ono | 395/700 |
| 5,101,491 | 3/1992 | Katzeff | 395/500 |
| 5,117,497 | 5/1992 | Kanamori et al. | 395/700 |
| 5,159,687 | 10/1992 | Richburg | 395/700 |
| 5,230,050 | 7/1993 | Iitsuka et al. | 395/700 |

Primary Examiner—Kevin A. Kriess
Assistant Examiner—Lucien Toplu
Attorney, Agent, or Firm—Foley & Lardner

[57] ABSTRACT

This automatic program generation system is a system to generate a target program by recursive conversion of program, which uses a specification input means to input specification and convert it into syntactic tree format and utilizes a design control means to control the conversion of the specification in syntactic tree format and outputs as a program the specification after conversion is repeated until it becomes impossible to further convert it. A design knowledge selection means selects select the design knowledge applied to the partial specification from the design knowledge base comprising accumulated design knowledge containing some program pieces and a relation part to indicate the mutual relation between them. A legitimate check means checks whether the partial specification matches with the applied design knowledge selected by the design knowledge selection means. When they match, it outputs the partial specification and the applied design knowledge, and when they do not match, it gives notice to that effect to the design knowledge selection means. A specification conversion means selects a specification conversion processing based on the partial specification and the applied design knowledge output from the legitimate check means.

11 Claims, 20 Drawing Sheets

```
exp    ::= assign|add|minus.
assign ::= exp'='exp.
add    ::= exp'+'exp.
minus  ::= exp'-'exp.
```

AUTOMATIC PROGRAM GENERATING SYSTEM USING RECURSIVE CONVERSION OF A PROGRAM SPECIFICATION INTO SYNTACTIC TREE FORMAT AND USING DESIGN KNOWLEDGE BASE

BACKGROUNDS OF THE INVENTION

FIELD OF THE INVENTION

The present invention relates to an automatic program generating system, and particularly relates to an automatic program generating system which converts program specification into syntactic tree format and transforms the converted specification to a target program using a design knowledge base.

DESCRIPTION OF THE PRIOR ART

Programming process by a programmer can be considered as steps to give more and more details to program specification. Some automatic program generating systems are provided with an automatic detailing mechanism using a design knowledge base containing accumulated design knowledge so as to convert the specification at steps of detailing to more detailed specification for automatic program generation.

A conventional program generating system of the type mentioned above is characterized as follows:

1) The system determines all pairs of partial specification to be converted in the entire specification and the design knowledge for detailing of the partial specification, determines the pairs of partial specification and design knowledge to be designed from all competing pairs above, then rewrites the partial specifications paired with design knowledge.

2) When obtaining partial specification to be converted from the entire specification at each detailing step, the system treats the entire specification as the subject of conversion.

3) In the form checking to see matching of the coupled partial specification and design knowledge, the system judges that the forms match only when partial specification and design knowledge have the same form or there exists a form matching with both forms when considered in form hierarchy.

4) The design knowledge format has an equal sign, a left side member and a right side member. The left and right side structures are parametrized pieces of program. When the applicable partial specification matches with the left side member, the system rewrites the partial specification using the match data and the right side structure.

5) The system does not use the knowledge contained in the design knowledge base during automatic program generation process.

6) The system does not delete any design knowledge contained in the design knowledge base during automatic program generation process.

7) The system does not record partial specification and design knowledge selected in the automatic program generation process.

In a conventionally proposed automatic program generating system as described above, there are some drawbacks:

1) The system always determines all pairs of partial specification to be converted in the entire specification and the design knowledge for detailing of the partial specifications. This means that, even when it is sufficient to execute a single design operation for the first pair of applicable partial specification and design knowledge by specifying the order of fetching partial specifications and the order of fetching design knowledge from the knowledge base, the system uselessly generates many other applicable pairs.

2) The system treats the entire specification as the subject of conversion when obtaining a partial specification to be converted from the entire specification at each detailing step. Lack of a split function to separate the area to be designed forces the system to always search the entire specification to find an applicable partial specification, which prolongs the searching time.

3) In form checking to see matching of the coupled partial specification and design knowledge, the system judges that the forms match only when partial specification and design knowledge have the same form or there exists a form matching with both forms when considered in form hierarchy. This means that, in form checking for variables of partial specification and design knowledge, a form on a form hierarchy without the minimum higher level is judged unacceptable at this point even if it can be correctly interpreted in later matching.

4) The design knowledge format has an equal sign, a left side member and a right side member, and the left and right side structures are parametrized pieces of program. Since the system rewrites the partial specification using the match data and the right side structure when the applicable partial specification matches with the left side member, the system cannot execute rewriting with recognizing the difference in structure.

5) Since the system does not use the knowledge contained in the design knowledge base during an automatic program generation process, it cannot include design knowledge in the input specifications for later design detailing process.

6) Since the system does not delete any design knowledge in the design knowledge base during an automatic program generation process, it is impossible to make a certain design knowledge inapplicable during design process, which may result in a too complicated design knowledge base.

7) Since the system does not record partial specifications and design knowledge selected during the automatic program generation process, it is quite difficult to detect incorrect contents in the knowledge base or errors in the input specification when the program obtained as the result of designing process is not satisfactory.

SUMMARY OF THE INVENTION

The object of the present invention is to provide an automatic program generating system which prevents useless generation of applicable pairs by generating pairs of partial specification and design knowledge for detailing of the partial specification one by one.

In a preferred embodiment of this invention to attain this object, the automatic program generating system which generates a target program by recursive conversion of program specification comprises:

- a specification input means to input specification and to convert it into syntactic tree format,
- a design control means to control the conversion of specification in syntactic tree format obtained by the specification input means,
- a design knowledge base constituted by accumulated design knowledge containing some program pieces and a relation section indicating the relation between them, a design knowledge selection means to select a design knowledge applicable to the partial specification to be converted when such knowledge exists, or, when no design knowledge can be selected, give notice to that effect to the design control means, a legitimate check means to check whether the partial specification to be converted matches with the applied design knowledge selected by the design knowledge selection means, which outputs the partial specification and the applied design knowledge when they are matching, and, when they are not matching, gives notice to that effect to the design knowledge selection means, a specification conversion means to select a specification conversion processing based on the partial specification and the applied design knowledge output from the legitimate check means, and a rewrite relation processing means selected by the specification conversion means when the relation section of the applied design knowledge indicates rewriting relation and rewrites the partial specifications according to the applied design knowledge.

A second object of this invention is to considerably reduce the searching time by enabling split of the areas as the subject of design before designing and thereby eliminating the need of searching over the entire specification when retrieving partial specifications.

According to a preferred embodiment to attain this object, the system is provided with a design split means invoked by the design control means, which judges whether the root node of the syntactic tree representing the specification is rewritable using the design knowledge base, and if not, splits the specification into sub trees and activates the design control means again for each of the sub trees.

A third object of this invention is to provide an automatic program generating system capable of, in form checking of variables from partial specification and design knowledge, accepting the structures which were improperly rejected by conventional method though they can be correctly interpreted by later matching, by means of checking the forms on the lattice structure comprising the forms obtained from hierarchy.

To achieve this object, according to a preferred embodiment, the system is provided with a lattice expandable form processing means, which is invoked by the legitimate check means and maps the form of the partial specification and the form of the program piece from design knowledge on the space of lattice comprising the forms introduced from the form hierarchy so that the means can Judge whether the forms are matching and determine the form of the variables.

A fourth object of this invention is to provide an automatic program generating system which is capable of rewriting with recognizing the difference in structure of specification by introducing a primitive relation and enabling the equivalency judgment of partial specification as primitive.

To achieve this object, according to a preferred embodiment, the system is provided with a primitive rewrite processing means, which is selected by the specification conversion means when the relation section of the applied design knowledge indicates the primitive relation and rewrites the partial specification using the primitive conversion knowledge peculiar to the system.

A fifth object of this invention is to provide an automatic program generating means which can handle the knowledge in the design knowledge base during automatic program generation process and can thereby fetch the design knowledge contained in the input specification for later use in design detailing processes.

To accomplish this object, according to a preferred embodiment, the system is provided with a meta primitive processing means selected by the specification conversion means when the relation section of the applied design knowledge indicates meta primitive relation and a knowledge base fetching means invoked by the meta primitive processing means and fetches the contents of the design knowledge base to the specification.

A sixth object of this invention is to provide an automatic program generation system capable of obtaining partial data from those contained in input specification for later use in design detailing processes and making certain knowledge inapplicable during designing process so as to prevent the design knowledge base from becoming too complicated, by adding new knowledge to and deleting certain knowledge from the design knowledge base during the automatic program generation processes.

To accomplish this object, according to a preferred embodiment, the system is provided with a meta primitive processing means selected by the specification conversion means when the relation section of the applied design knowledge indicates meta primitive relation and a knowledge base changing means invoked by the meta primitive processing means to add the design knowledge described in the specification to the design knowledge base or to delete the design knowledge matching with the program pieces described in the specification from the design knowledge base.

A seventh object of this invention is to provide an automatic program generating system which records the partial specification and design knowledge selected during automatic program generation process so as to enable detection of inappropriate contents of the knowledge base or errors in input specification.

To achieve these objects, according to a preferred embodiment, the system is provided with a derivation recording means which is invoked by the specification conversion means and records a group of partial specification, applied design knowledge and partial specification after conversion and a design process report means which refers to the derivation generated by the derivation recording means and reports design processes.

According to another preferred embodiment, the system is provided with a design split means which is invoked by the design control means, judges whether the root node of the syntactic tree representing the specification is rewritable using the design knowledge base, splits the specification into sub trees when the node is not rewritable and activates the design control means again for each sub tree and a lattice expandable form processing means which is invoked by the legitimate check means, maps the form of the partial specification and the form of the program piece from the design knowledge on the space of lattice comprising the forms introduced from the form hierarchy so that the system can judge whether the forms are matching and determine the form of variables.

According to still another preferred embodiment, the system is provided with a lattice expandable form processing means and a primitive rewrite processing means. The former, invoked by the legitimate check means, maps the form of the partial specification and the form of the program piece from the design knowledge on the space of lattice comprising the forms introduced from the form hierarchy for judgment whether the forms are matching and determination of the form of variables. The latter, selected from the specification conversion means when the relation section of the applied design knowledge indicates "primitive relation"

and rewrites the partial specification using the primitive conversion knowledge peculiar to the system.

Alternatively, the system comprises a design split means which is invoked by the design control means, judges whether the root node of the syntactic tree representing the specification is rewritable using the design knowledge base, splits the specification into sub trees when it is not rewritable, and activates the design control means again for each of the sub trees;

a design split means which is invoked by the design control means, judges whether the root node of the syntactic tree representing the specification is rewritable using the design knowledge base, splits the specification into sub trees when it is not rewritable, and activates the design control means again for each of the sub trees; and a primitive rewrite processing means which is selected by the specification conversion means when the relation section of the applied design knowledge indicates "primitive relation" and rewrites the partial specification using the primitive conversion knowledge peculiar to the system.

According to a still another preferred embodiment of this invention, the automatic program generating system which repeats conversion of program specification for generating a target program comprises a specification input means to input the specification and convert it into syntactic tree format;

a design control means to control conversion of specification in syntactic tree format obtained by the above specification input means;

a design knowledge base constituted by accumulated design knowledge containing some program pieces and a relation section to represent mutual relation between them;

a design split means which is invoked by the above design control means, judges whether the root node of the syntactic tree representing the specification is rewritable using the design knowledge base, splits the specification into sub trees when it is not rewritable and activates the design control means again for each of the sub trees;

a design knowledge selection means to select design knowledge applied to the partial specification to be converted from the design knowledge base when selection is possible;

a legitimate check means to check whether the partial specification to be converted matches with the applied design knowledge selected by the design knowledge selection means and if they match, outputs the partial specification and the applied design knowledge;

a lattice expandable form processing means which is invoked by the legitimate check means, maps the form of the partial specification and the form of program piece from the design knowledge on the space of lattice comprising forms introduced from the form hierarchy so that the system can Judge whether they are matching and determine the form of variables;

a specification conversion means to select a specification conversion processing based on the partial specification and applied design knowledge output by the legitimate check means;

a rewrite relation processing means which is selected by the specification conversion means when the relation section of the applied design knowledge indicates a rewriting relation and rewrites the partial specification according to the applied design knowledge; a primitive rewrite processing means selected by the specification conversion means when the relation section of the applied design knowledge indicates "primitive relation" and rewrites the partial specification using the primitive conversion knowledge peculiar to the system;

a meta primitive processing means selected by the specification conversion means when the relation section of the applied design knowledge indicates meta primitive relation;

a knowledge base fetching means which is invoked by the meta primitive means and fetches the contents of the design knowledge base into the specification;

a knowledge base changing means which is invoked by the meta primitive processing means and adds the design knowledge described in the specification to the design knowledge base or deletes the design knowledge matching with the program pieces described in the specification from the design knowledge base;

a derivation recording means which is invoked by the specification conversion means and records a group of partial specification, applied design knowledge and partial specification after conversion; and a design process report means to refer to the derivation generated by the derivation recording means and report the design process.

Other objects, characteristics and effects of the present invention will be clarified in the detailed description below.

DESCRIPTION OF THE PREFERRED EMBODIMENT

Figure 1A:
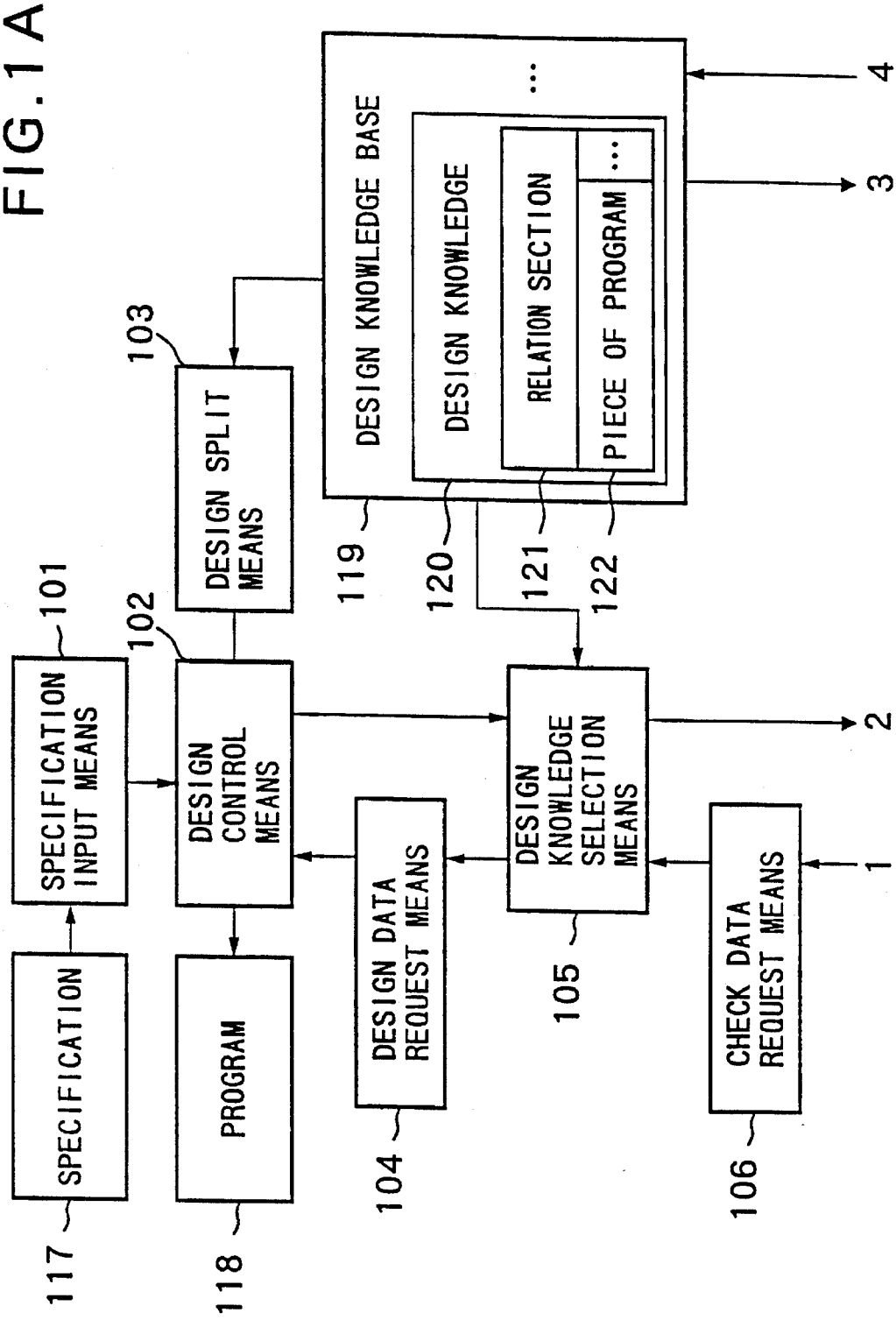
FIGS. 1A and 1B are entire configuration diagrams of an automatic program generating system according to an embodiment of this invention.
Figure 1B:
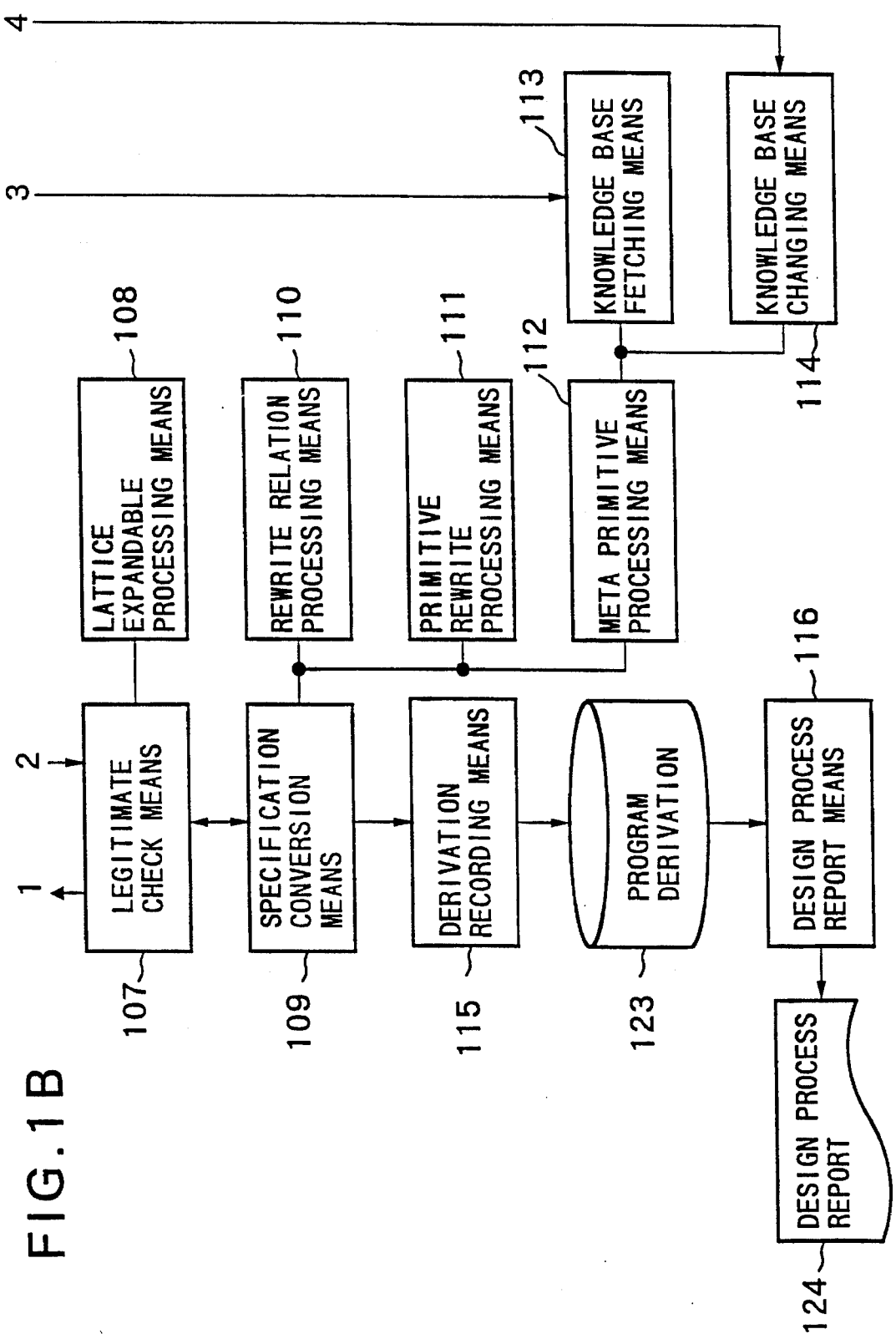

Referring to FIGS. 1 to 5, a preferred embodiment of the present invention is now described. FIGS. 1A and B, referred to as FIG. 1, show the entire configuration of an automatic program generating system according to an embodiment of the present invention.

In FIG. 1, a specification input means 101 is a means for input of a program specification 117, which also converts the specification 117 into syntactic tree format. A design control means 102 is a means to control conversion of the specification in syntactic tree format obtained by the specification input means 101. It repeats conversion until it becomes impossible to convert the specification in syntactic tree format any more and outputs the specification which cannot be converted any more as a program 118 resulting from conversion.

A design split means 103 is a means invoked by the design control means 102. It judges whether the root node of the syntactic tree representing the specification is rewritable using design knowledge base 119 (described later) or not. If it is not rewritable, the specification is split into sub trees and then the design control means 102 is activated again for each of the sub trees.

A design knowledge base 119 comprises accumulated design knowledge 120 constituted by some program pieces and a relation section 121, which is the knowledge indicating the mutual relation between program pieces 122.

When the design knowledge 120 applicable to the partial specification to be converted can be selected from the design knowledge base 119, a design knowledge selection means 105 selects that applicable design knowledge 120 and passes it to a legitimate check means 107. When no design knowledge can be selected, the design knowledge selection means 105 gives notice to that effect to the design control means 102 using a design data request means 104.

The legitimate check means 107 checks whether the partial specification matches with the applied design knowledge 120. The legitimate check means 107 passes the partial specification and applied design knowledge 120 to specification conversion means 109 when they match, or gives notice of no match to the design knowledge selection means 105 using the check data request means 106 when they are not matching.

A lattice expandable for processing means 108 is a means invoked by the legitimate check means 107 check of the form matching. It maps the form of partial specification and the form of program piece 122 of the design knowledge 120 on the space of lattice comprising the forms introduced from the form hierarchy so that the means can judge whether the forms match and determines the form after matching when they match.

A specification conversion means 109 is a means to select a specification conversion processing based on the partial specification and applied design knowledge 120. A rewrite relation processing means 110 is a means selected by the specification conversion means 109 when the relation section 121 of the applied design knowledge 120 indicates "rewriting relation" and rewrites the partial specification according to the applied design knowledge.

A primitive rewrite processing means 111 is a means selected by the specification conversion means 109 when the relation section 121 of the applied design knowledge 120 indicates "primitive relation" and rewrites the partial specification using the primitive conversion knowledge peculiar to the system.

A meta primitive processing means 112 is a means selected by the specification conversion means 109 when the relation section 121 of the applied design knowledge 120 indicates "meta primitive relation". A knowledge base fetching means 113 is a means invoked by the meta primitive processing means 112 and fetches the design knowledge base 119 wholly or partially to the specification 117.

A knowledge base changing means 114 is a means invoked by the meta primitive processing means 112. It adds the design knowledge described in the specification 117 to the design knowledge base 119 or deletes the design knowledge 120 matching with the program pieces described in specification 117 from the design knowledge base 119.

A derivation recording means 115 is a means invoked by the specification conversion means 109 and records a set of partial specification, applied design knowledge 120 and partial specification after conversion to program derivation 123 as a history data. A design process report means 116 is a means to refer to the program derivation 123 generated by the derivation recording means 115 and outputs the design process report 124.

Operations of the system of this embodiment having the configuration mentioned above are outlined below.

When a user prepares a program specification 117 and gives it to the automatic program generating system according to this embodiment, the specification input means 101 inputs the specification 117, converts it into syntactic tree format and then gives it to the design control means 102. The design control means 102 invokes the design split means 103 or takes other actions to control conversion of specification in syntactic tree format. It repeats the conversion until it becomes impossible to convert the specification any more. The specification which cannot be converted any more is output as a program 118 resulting from conversion.

The design split means 103 is invoked by the design control means 102 and judges whether the root node of the syntactic tree representing the specification is rewritable using the design knowledge base 119. If it is not rewritable, it splits the specification into sub trees and activates the design control means 102 again for each of the sub trees. If the root node is rewritable, the design split means 103 activates the design knowledge selection means 105 via the design control means 102.

The design knowledge selection means 105 selects the design knowledge 120 applied to the partial specification to be converted from the design knowledge base 119 and passes it to the legitimate check means 107. If there is not any selectable design knowledge 120, the design knowledge selection means 105 gives notice to that effect to the design control means 102 using the design data request means 104. The design control means 102 learns from the notice that the specification becomes inconvertible.

The legitimate check means 107 receives the partial specification and applied design knowledge 120 from the design knowledge selection means 105 and checks them to see whether they match. For this, the legitimate check means 107 invokes the lattice expandable form processing means 108 if required for checking whether or not the forms match. The legitimate check means has it map the form of partial specification and form of program piece 122 of the design knowledge 120 on the space of lattice comprising the forms introduced from the form hierarchy so that the means can judge whether the forms are matching. If the form of the partial specification matches with the form of the program piece 122 from the design knowledge 120, then the form after matching is determined and the matching is checked based on the result. If the partial specification and the applied design knowledge 120 match, the legitimate check means 107 passes the partial specification and applied design knowledge 120 to the specification conversion means 109. If they do not match, the legitimate check means gives notice to that effect to the design knowledge selection means 105 using the check data request means 106. Upon receiving the notice, the design knowledge selection means 105 retries selection of design knowledge 120 applicable to the partial specification to be converted from the design knowledge base 119.

Upon receiving the partial specification and applied design knowledge 120 from the legitimate check means 107, the specification conversion means 109 selects a specification conversion processing based thereon them. In other words, if the applied design knowledge 120 has the relation section 121 indicating "rewriting relation", the means selects the rewrite relation processing means 110 to rewrite the partial specification. If the applied design knowledge has the relation section 121 indicating "primitive relation", the means selects the primitive rewrite processing means 111 to rewrite the partial specification using the primitive conversion knowledge peculiar to the system. If the relation section 121 of the applied design knowledge 120 indicates "meta primitive relation", the meta primitive processing means 112 is selected. When the meta primitive processing means 112 is selected, it invokes the knowledge base fetching means 113 or knowledge base changing means 114. The invoked knowledge base fetching means 113 fetches the design knowledge base 119 wholly or partially, and the knowledge base changing means 114 adds the design knowledge described in the specification to the design knowledge base 119 or deletes the design knowledge 120 matching with program pieces described in specification from the design knowledge base.

On the other hand, the specification conversion means 109, after every specification conversion, invokes the derivation recording means 115 to have it record a set of partial specification, applied design knowledge 120 and the partial specification after conversion to the program derivation 123.

As described above, the target program 118 is generated through repeated conversion of program specification 117 using the design knowledge base 119. After generation, the design process reporting means 116 refers to the program derivation 123 and outputs the design process report 124.

Next, referring to FIGS. 2 to 24, operations of the parts in the automatic program generating system shown in FIG. 1 are described in detail.

In this embodiment, the Syntax of the language describing the specification 117 is defined with context-free grammar. In addition, the language expressing the specification 117 and the finally output program 118 is the one defined by the syntax to describe variables having the program pieces as its value range and the other syntax to describe the terms for abstract expression of program pieces for this embodiment. A term here is a format where a functor name is followed by some terms put in parentheses: Functor name (term, . . . ). A functor name is an identifier. The context-free grammar can be described in Backus-Naur form (BNF).

Figures 2, 3:
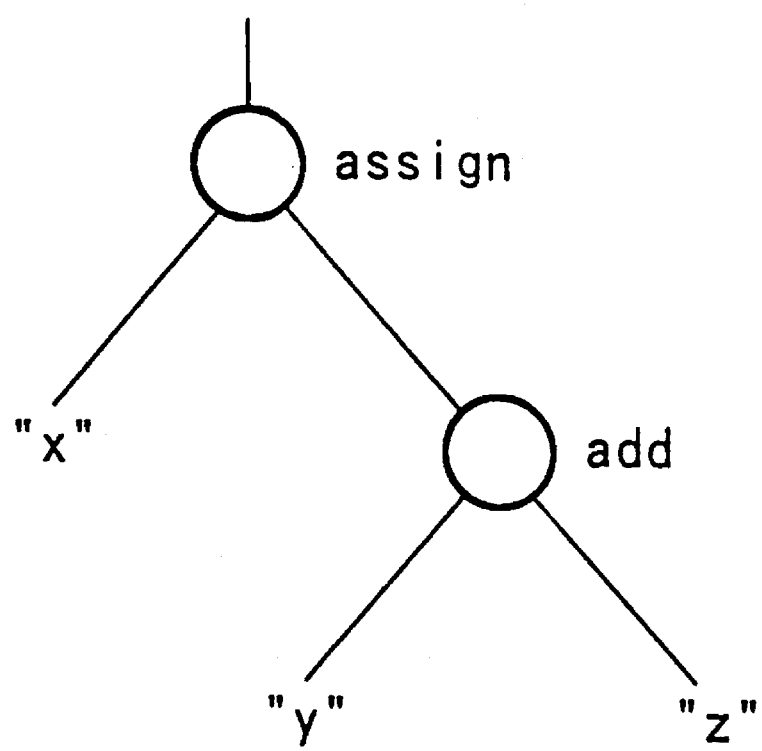
FIG. 2 is a diagram to show an example of syntax defined using Backus-Naur Form (BNF)
FIG. 3 is a diagram to show an example where a symbol string described by syntax defined in BNF is converted into a tree format.

FIG. 2 shows an example of syntax defined in BNF. The language description x=y+z can be considered as the term description having functor name=assign, i.e. assign ("x", add ("y", "z")). The term can be converted to a format having the functor name "assign" as the node and an arc provided from the node to the child converted into syntactic tree format. For example, the term description assign ("x" ("y", "z")) can be converted into a syntactic tree as shown in FIG. 3. By this method, any specification 117 described in specification description language can be converted to syntactic tree format. The specification input means 101 in this embodiment inputs the specification 117 described in specification description language and converts it into the syntactic tree format according to the procedure shown above.

Figure 4:
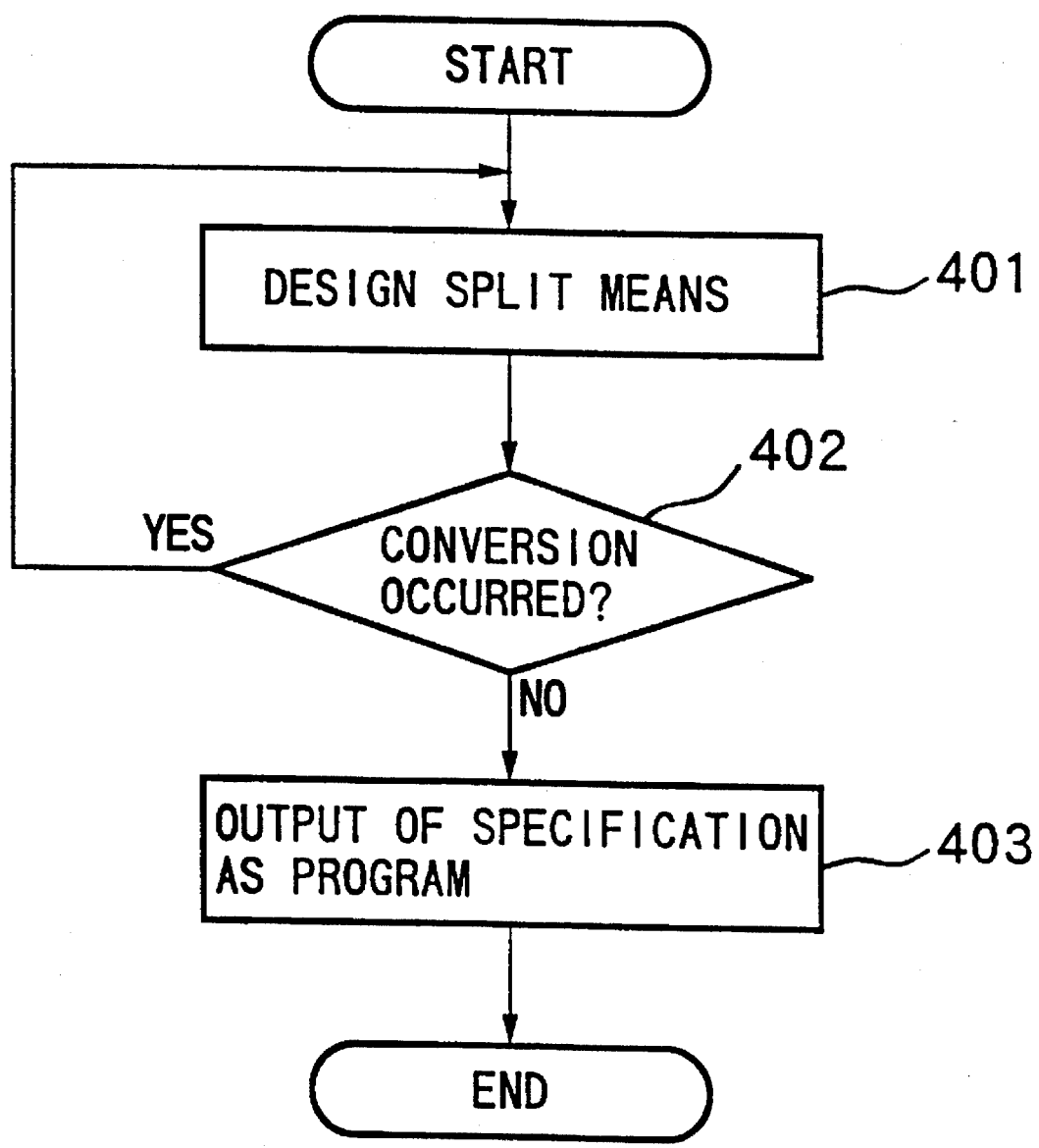
FIG. 4 is a flowchart to illustrate the operation of a design control means 102.

FIG. 4 is a flowchart to show the operation of the design control means 102. The design control means 102 controls the entire system of this embodiment. The design control means 102 passes the specification converted into the syntactic tree format at the specification input means 101 to the design split means 103, which is considered as an internal processing means of the design control means (Step 401). Then, in Step 402, the result of processing at the design split means 103 is used for Judgment to see whether or not conversion was made. If it is learned in Step 402 that conversion was made, then the process of Step 401 is repeated for continuous conversion with passing the converted specification to the design split means 103.

If it is learned in Step 402 that conversion was not made, then the specification at the time when design data is requested by the design data request means 104 is the final result. In Step 403, this specification is output as the program 118.

Figure 5:
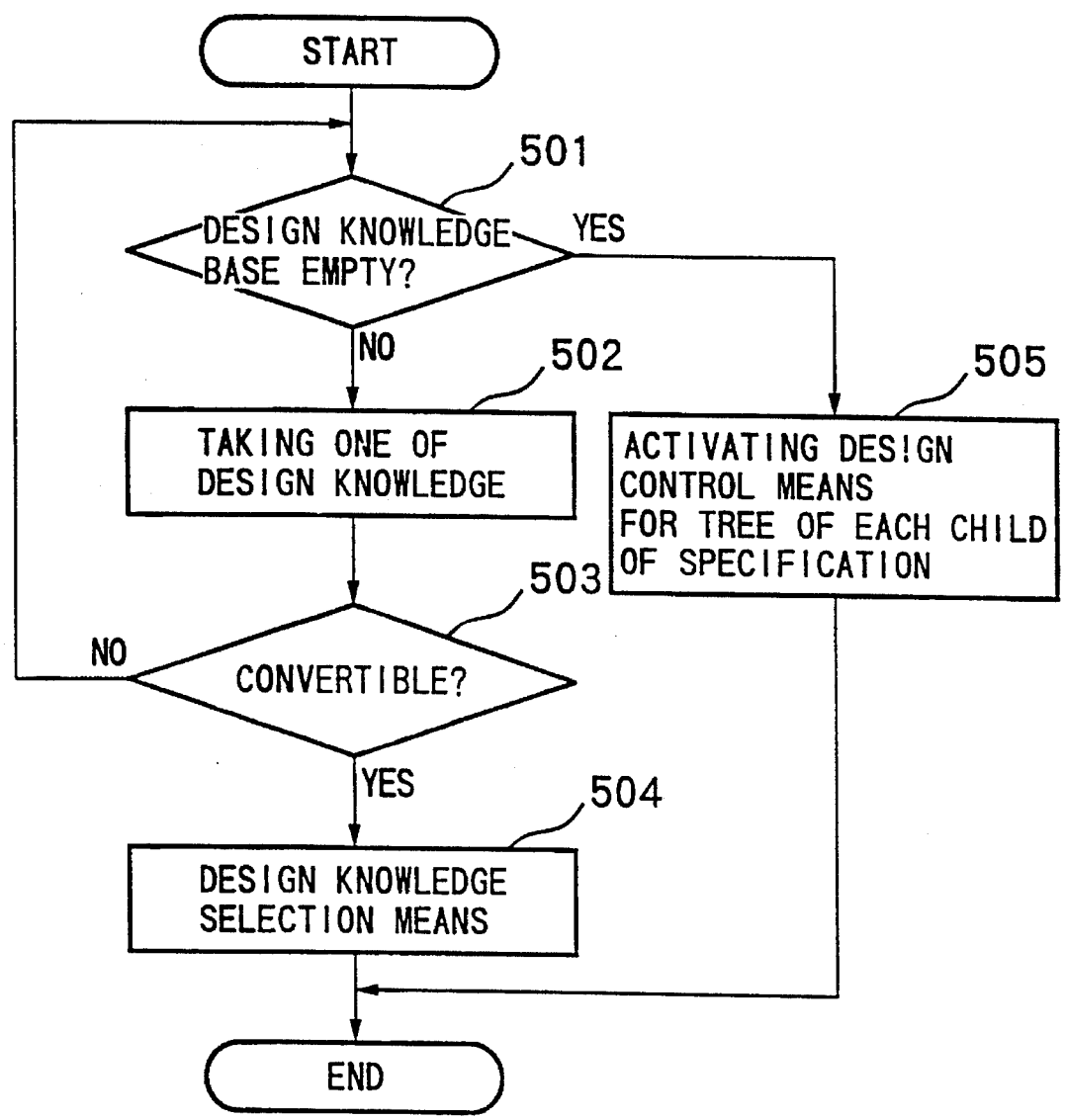
FIG. 5 is a flowchart to describe the operation of a design split means 103.

FIG. 5 is a flowchart to illustrate the operation of the design split means 103. The design split means 103 first checks whether the specification as the subject of design is convertible using the design knowledge base 119 it is now accessing. For this purpose, the design split means checks whether there are any design knowledge 120 remaining unchecked in the design knowledge base 119 in Step 501. If any design knowledge 120 remains unchecked, one design knowledge 120 is taken out in Step 502 and it is checked whether the specification as the subject of design can be converted using the design knowledge 120 in Step 503. If there is possibility of conversion, the design knowledge selection means 105 is activated for the specification as the subject of design in Step 504.

If no design knowledge 120 is remaining in Step 501, then that specification itself as the subject of conversion may not be converted for every design knowledge 120 in the design knowledge base 119. In such a case, this specification can be removed from the subjects of design, and designing is to be performed only for child trees, which are partial specifications of the specification. For this purpose, the design control means 102 is activated again for the child trees. Child trees here are sub trees (partial specifications) representing the term 1, term 2, ... term n when the specification as the subject of design is in functor 1 (term 1, term 2, ... term n) format.

Figure 6:
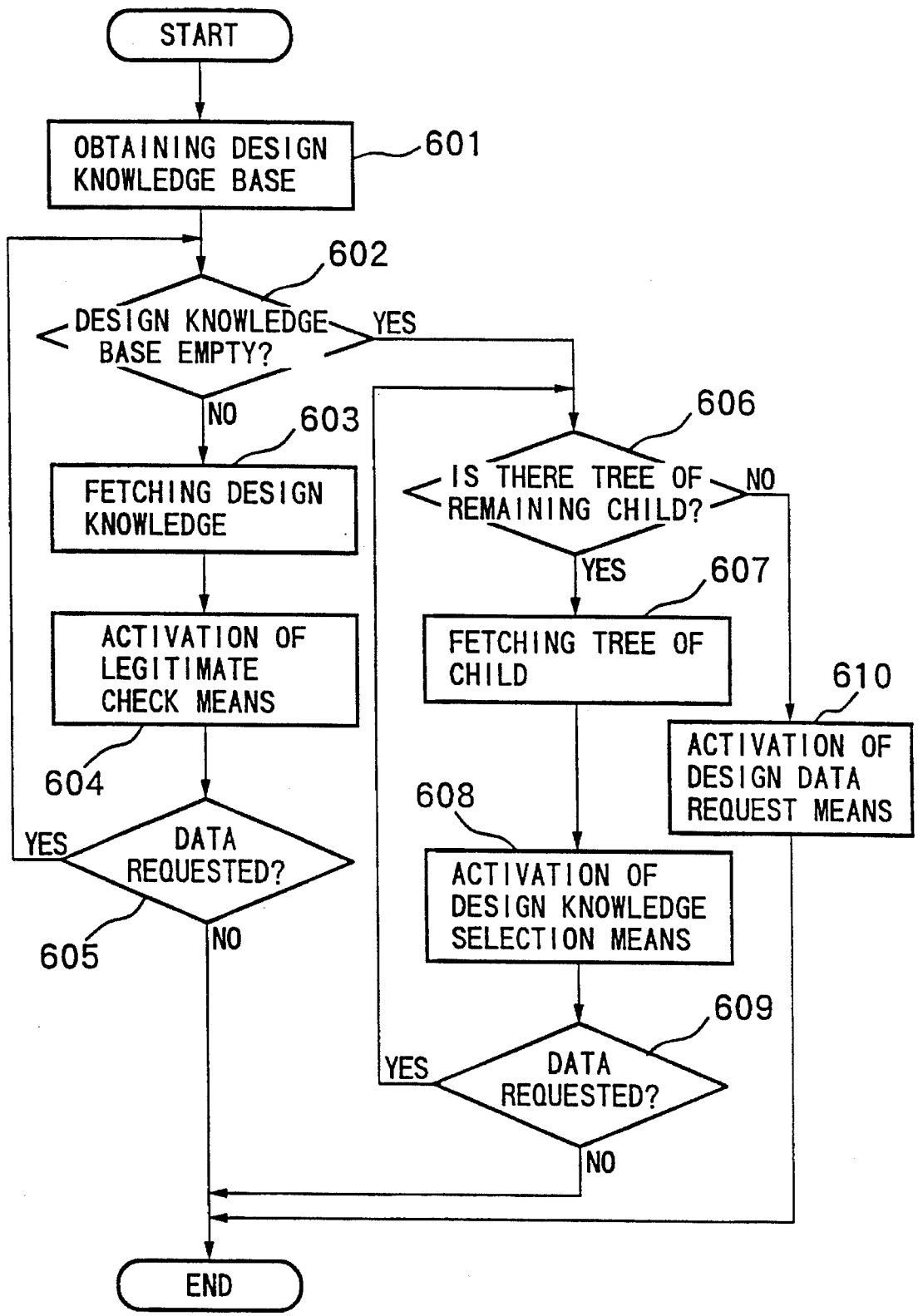
FIG. 6 is a flowchart to explain the operations of a design knowledge selection means 105 and a design data request means 104.

FIG. 6 is a flowchart to describe the operation of the design knowledge selection means 105 and the design data request means 104. The design knowledge selection means 105 receives the specification to be designed from the design control means 102 and accesses again the design knowledge base 119 to be applied to the specification (Step 601). Then, in Step 602, it is checked whether there is any design knowledge 120 not yet applied to the specification to be designed in the design knowledge base 119. If there exists any design knowledge to be applied, the design knowledge 120 is fetched in Step 603. The pair of the design knowledge 120 and the specification to be designed is passed to the legitimate check means 107 for matching check and the response is received (Step 604).

In Step 605, it is checked whether or not the legitimate check means 107 used the check data request means 106 for response. If not, the converted specification returned by the legitimate check means 107 is treated as the returned value and the control is returned to the design control means 102. If the legitimate check means 107 used the check data request means 106, the operation goes back to Step 602 in order to obtain the next design knowledge.

If there is not any design knowledge 120 to be applied in Step 602, the operation proceeds to Step 606. In Step 606, child trees (partial specifications) of the specification to be converted are checked to see if there are some trees to which the design knowledge selection means 105 is not applied yet. If there exists a partial specification to which the design knowledge selection means 105 is not yet applied, that partial specification is fetched (Step 607), and the design knowledge selection means 105 itself is activated in Step 608. Child trees or partial specifications here mean term 1, term 2, ... term n in the specification to be designed in functor 1 (term 1, term 2, ..., term n) format, for example. Next, this result is evaluated in Step 609 and if data request by the check data request means 106 occurs, the operation returns to Step 606. If there is not any data request, the specification after conversion obtained as a result of Step 608 is returned and the procedure terminates.

On the other hand, if no partial specification is remains in Step 606, the design data request means 104 is activated in Step 610. The design knowledge selection means 105 can be obtained by function call from the design control means 102. In this case, the design data request means 104 can be invoked by returning a function value including a special value to indicate the data request.

Figure 7:
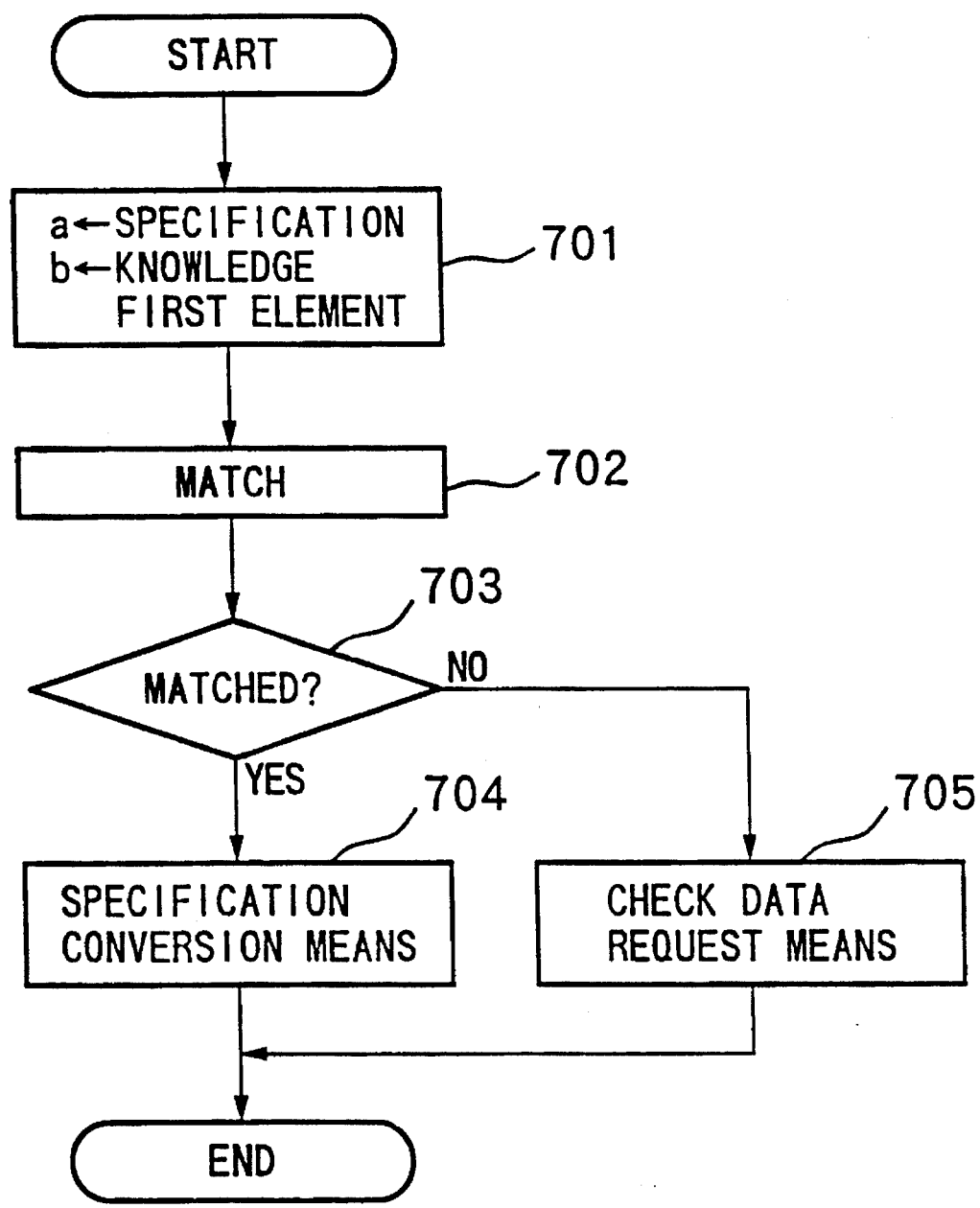
FIG. 7 is a flowchart to explain the operation of a legitimate check means 107 and a check data request means 106.

FIG. 7 is a flowchart to illustrate the operation of the legitimate check means 107 and the check data request means 106. In Step 701, the legitimate check means 107 receives the specification and the design knowledge 120 from the design knowledge selection means 105 and fetches the first program piece 122 from the design knowledge 120. Next, in Step 702, the received specification and the fetched program piece 122 are input to match routine, which is a subroutine of the legitimate check means 107. Then, in Step 703, the result of the matching is evaluated and the operation proceeds to the Step 704 if the matching was successful. If the matching result was not successful, then the processing in Step 705 is performed.

In Step 704, the specification conversion means 109 is activated and the unifier as the result of matching, specification and the design knowledge 120 are passed to it. In Step 705, the check data request means 106 is activated and requests the design knowledge selection means 105 to provide the next input data. The legitimate check means 107 can be activated by function call from the design knowledge selection means 105. In this case, the check data request means 106 returns "NUL", which is a special value as a returned value to request for check data.

Figure 8:
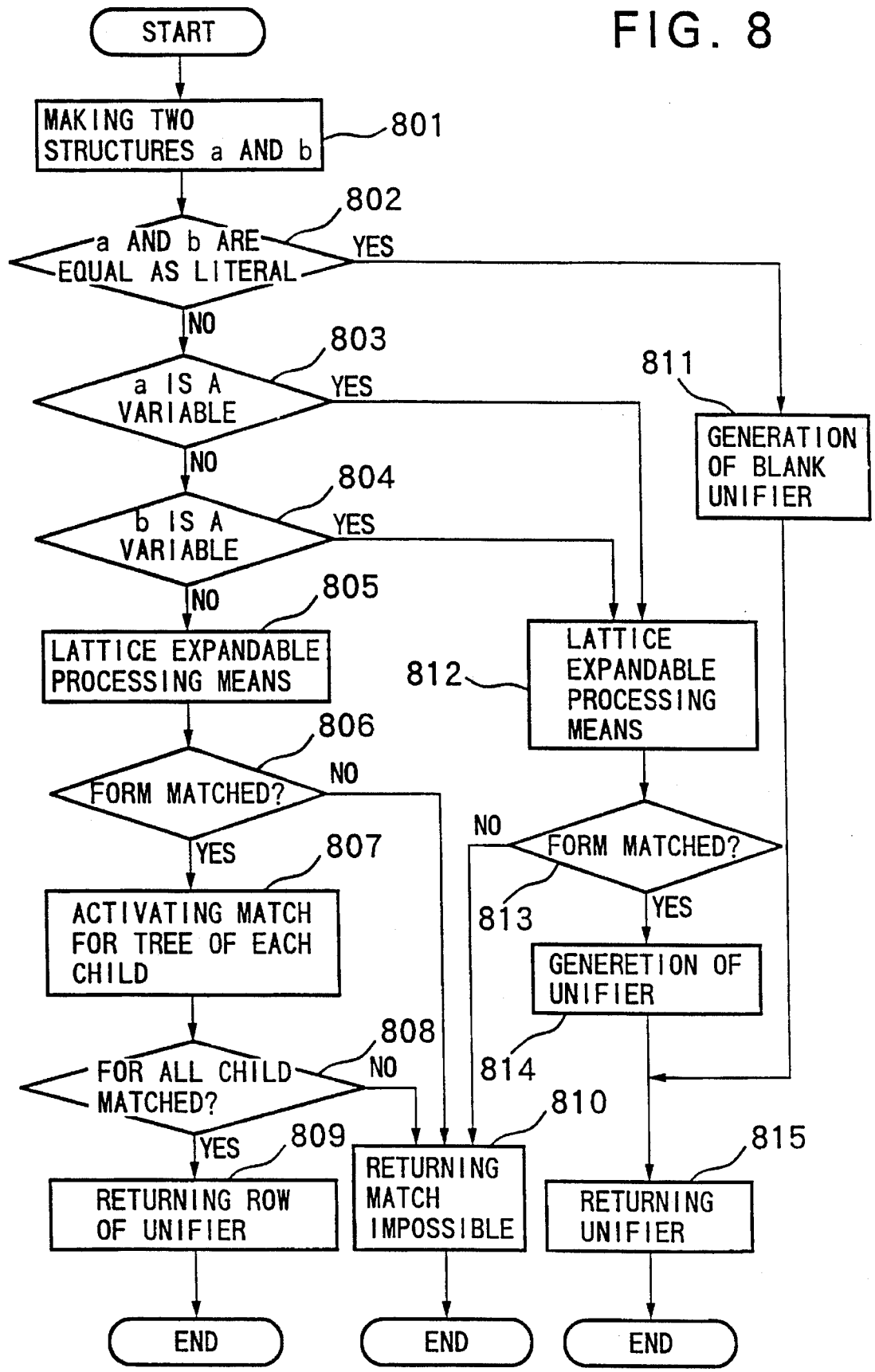
FIG. 8 is a flowchart to illustrate the operation of a legitimate check means 107 and a match routine, which is a subroutine.

FIG. 8 is a flowchart to illustrate the operation of the match routine, which is a subroutine of the legitimate check means 107 (Step 702 in FIG. 7). The match routine, in Step 801, treats the specification and program piece 122 input as two structures a and b. In Step 802, the two structures a and b are; judged equal if both are identical as literal (constant). When they are equal, a blank unifier is generated in Step 811 and returned in Step 815. When the two structures are not judged equal in Step 802, it is judged whether the structure a is a variable or not in Step 803. If the structure a is a variable, the lattice expandable form processing means 108 is invoked to check whether the structures a and b have a matching form (Step 812). The result of the check in Step 812 is judged in Step 813. If the forms do not match, unmatch is returned in Step 810. If the forms match, a pair of a variable a and a structure b (unifier) is created in Step 814. Then, the unifier created in Step 814 is returned in Step 815.

When it is learned that the structure a is not a variable in Step 803, it is judged whether or not the structure b is a variable in Step 804. If the structure b is a variable, the lattice expandable form processing means 108 is activated to check whether the forms of structures b and a are matching in Step 812. The result of the check in Step 812 is judged in Step 813. If the forms were not matching, unmatch is returned in Step 810. If the forms are matching, a pair of a variable b and a structure a (unifier) is created in Step 814. Then, the unifier created in Step 814 is returned in Step 815.

When it is learned that the structure b is not a variable in Step 804, it is judged whether or not the structure a and structure b have matching forms using the lattice expandable form processing means 108 in Step 805. Then, the result of the check in Step 805 is investigated to see whether or not the forms are matching in Step 806. If they are not matching, unmatch is returned (Step 810).

When the structure a has a format comprising a functor a followed by (child a1, child a2, ... child aj) and the structure b has a format comprising a functor b followed by (child b1, child b2, ..., child bk), j=k if their forms match. In Step 807, when the forms are matching, the match routine itself is activated again for all corresponding pairs of children in structures a and b. Here, all corresponding children mean the structure am and structure bm, where $1 \leq m \leq j$. The result is judged in Step 808. If all corresponding children match, a series of unifiers obtained from the matchings in Step 809. If there is any child which cannot be matched, unmatch is returned in Step 810.

Figure 9:
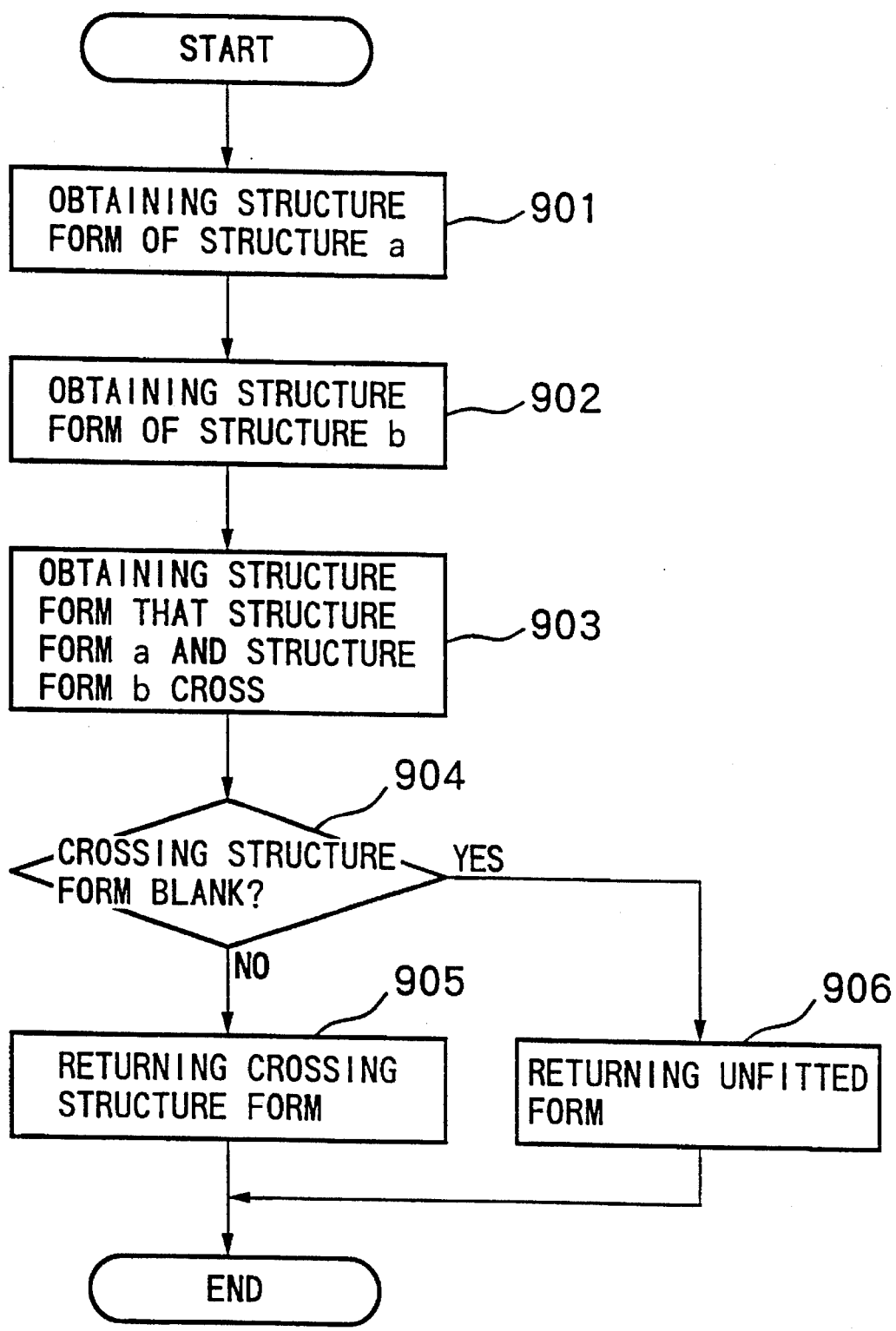
FIG. 9 is a flowchart to illustrate the operation of a lattice expandable processing means 108.

FIG. 9 is a flowchart to illustrate the operation of the lattice expandable form processing means 108. First of all, the lattice expandable form processing means 108, in Step 910, obtains the structure form of the structure a, which is one of the two structures a and b, by the structure form obtaining procedure, which is a subroutine of the lattice expandable form processing means. Next, in Step 902, the lattice expandable form processing means 108 obtains the structure form of the structure b, which is the other one of the two structures a and b, by the structure form obtaining procedure, which is a subroutine of the lattice expandable form processing means. In Step 903, a structure form as an intersection of the structure forms of structures a and b obtained in Steps 901 and 902 is obtained by the crossing structure form procedure, which is a subroutine of the lattice expandable form processing means 108.

In Step 904, it is judged whether or not the crossing structure form obtained in Step 903 is blank. If the crossing structure form is not blank, the structure a and structure b are considered matching, and this crossing structure form is returned in Step 905. If the crossing structure form is blank, it is considered that the forms of structure a and structure b are not matching and the form unmatching is returned in Step 906.

Figure 16:
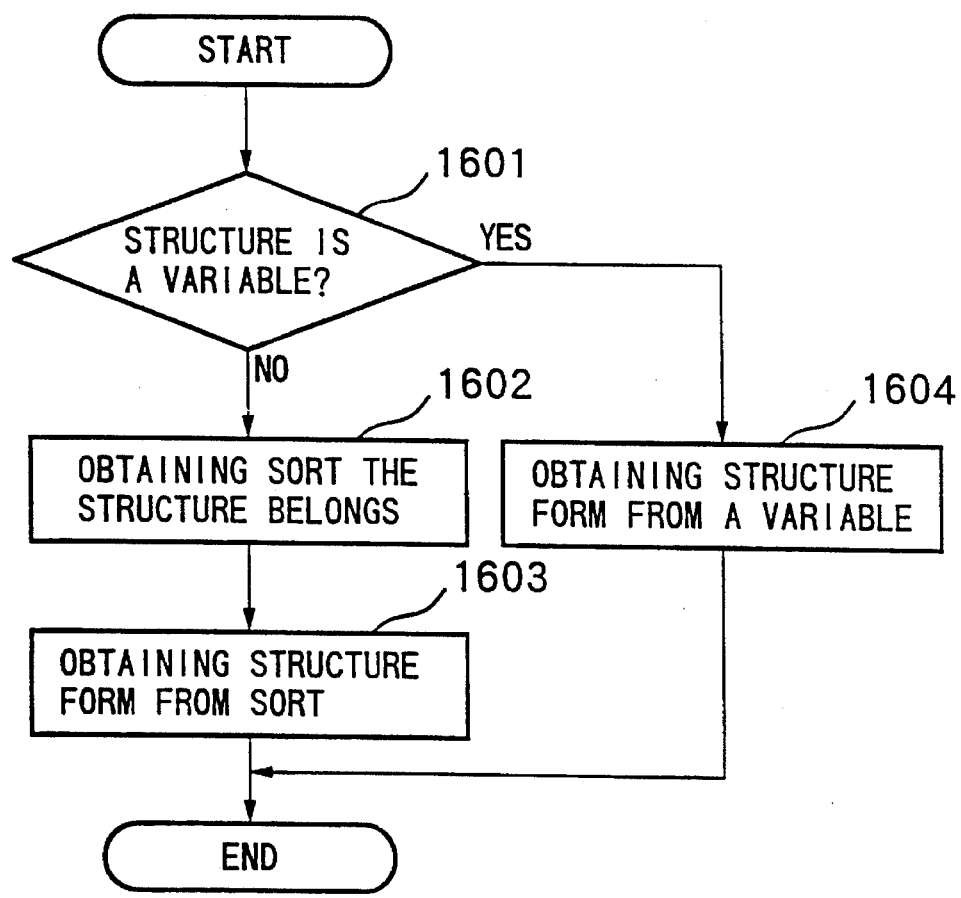
FIG. 16 is a flowchart to illustrate the operation of the structure form obtaining procedure, which is a subroutine of the lattice expandable processing means 108.

FIG. 16 is a flowchart to illustrate the operation of the structure form obtaining procedure, which is a subroutine of the lattice expandable form processing means 108. Before describing the operation shown in the flowchart of FIG. 16, the data structure used in the lattice expandable form processing means 108 and its meaning are described.

Figure 10:
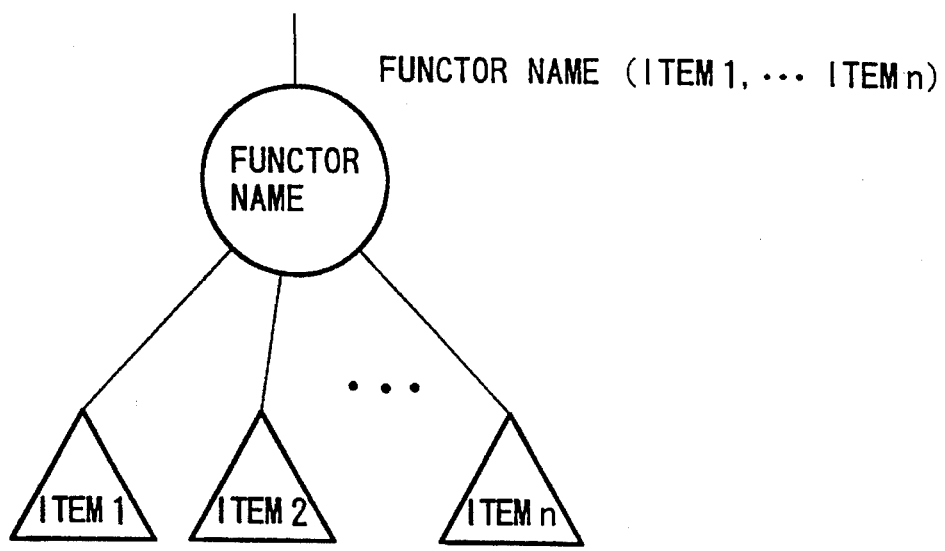
FIG. 10 is a diagram to illustrate the relation between the tree of a structure and a tree in functor format.

The lattice expandable form processing means 108 checks whether or not the structure types are matching. The structure here means the Structure of the specification (partial specification) or a program piece 122 as mentioned for the legitimate check means 107. Specification (partial specification) and program piece 122 are structured as shown in FIG. 10. It is a tree structure in the format "functor name (term, . . . )", and can be classified according to the functor name in the structure. The names used for classification of functors are called sorts.

Figure 11:
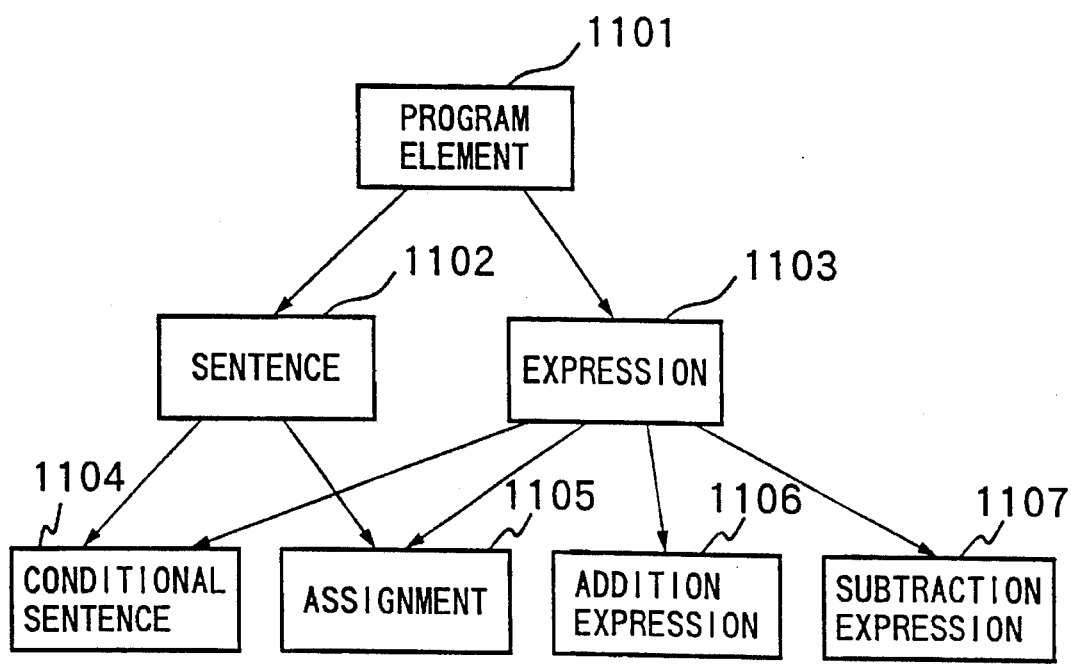
FIG. 11 is a diagram to show an example of sorts and sort hierarchical.

In general, a partial order relation is established among sorts, which results in forming a sort hierarchical. FIG. 11 shows an example of sorts and sort hierarchical. A program element 1101, a sentence 1102, an expression 1103, a conditional sentence 1104, an assignment 1105, an addition expression 1106, and a subtraction expression 1107 are sorts. Between the sorts connected by an arrow, an order relation exists. For example, the functor "IF" of the structure "IF (x==y, x=x+1, x=x+2)" is classified to the conditional sentence 1104.

When two structures fall in the same sort, or when the sort which either of the structures is classified to is in transitive closure relation with the other sort which the other structure is classified to from the viewpoint of order relation, the two structures are considered to be matching. For example, if a structure is classified to the addition expression 1106 and the other structure is classified to the expression 1103, there is an established order relation between the addition expression 1106 and the expression 1103, both of which are sorts, and they are in transitive closure relation from the viewpoint of order relation. Therefore, the structure classified to the addition expression 1106 and the structure classified to the expression 1103 are matching for forms.

When the two structures are variables, however, there are some cases where the forms are considered matching even though the two structures do not fall in the same sort and neither of the sorts are in the transitive closure relation considering the order relation between the sort either structure is classified to and the other sort the other structure is classified to. Suppose two variables are classified to the sentence 1102 and expression 1103 respectively. The sentence 1102 and the expression 1103 are not the same sort and they are not in the transitive closure relation regarding order relation (order relation is not fixed). However, after matching of the variables, they can be matched with the conditional sentence 1104 or assignment 1105. Because the conditional sentence 1104 and the assignment 1105 are in transitive closure relation with the sentence 1102 and the expression 1103 respectively regarding the order relation. Therefore, in this invention, the sort hierarchical shown in FIG. 11 is expanded to a lattice of sort hierarchies for check of form matching.

Figure 12:
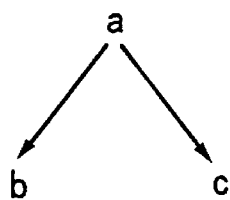
FIG. 12 is a diagram to show an example of sort hierarchical.
Figure 13:
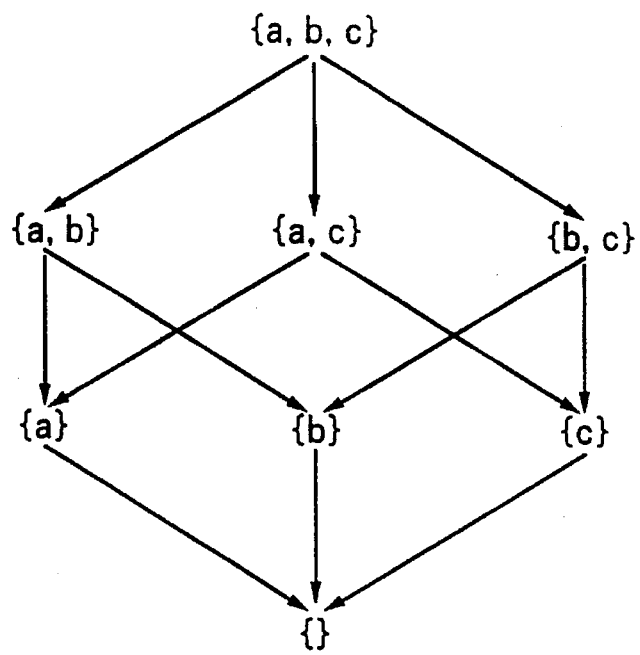
FIG. 13 is a diagram to show a lattice structure generated from sort hierarchical.

When a group (set) including all sorts is referred to as "Sorts", then there is a partial order set constituted by the power set P(Sorts) of Sorts and the inclusion relation $\subset$ for P(Sorts). This partial order set is expressed as POW_SORTS [P(Sorts), $\subset$] in this embodiment. For example, when a sort hierarchy comprising three sorts a, b and c given in FIG. 12 is Sorts, POW_SORTS [P(Sorts), $\subset$] is as shown in FIG. 13. In the sort hierarchy in FIG. 11, POW_SORTS [P(Sorts), $\subset$] hierarchy corresponding to FIG. 13 can be considered. Such a hierarchical structure is generally called a lattice.

To an arbitrary element s of Sorts, a set expressed as $$\text{lower}(s) = \{x | x \in \text{Sorts}, x \leq s\}$$

can be provided. Such a set of lower(s) thus generated is called Lowers in this embodiment. In short, $$\text{Lowers} = \{x | x = \text{lower}(s), S \in \text{Sorts}\}.$$

Figure 14:
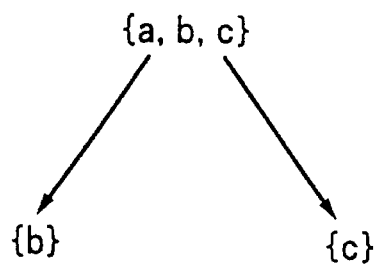
FIG. 14 is a diagram to show subsets of power set corresponding to the sort hierarchical.
Figure 15:
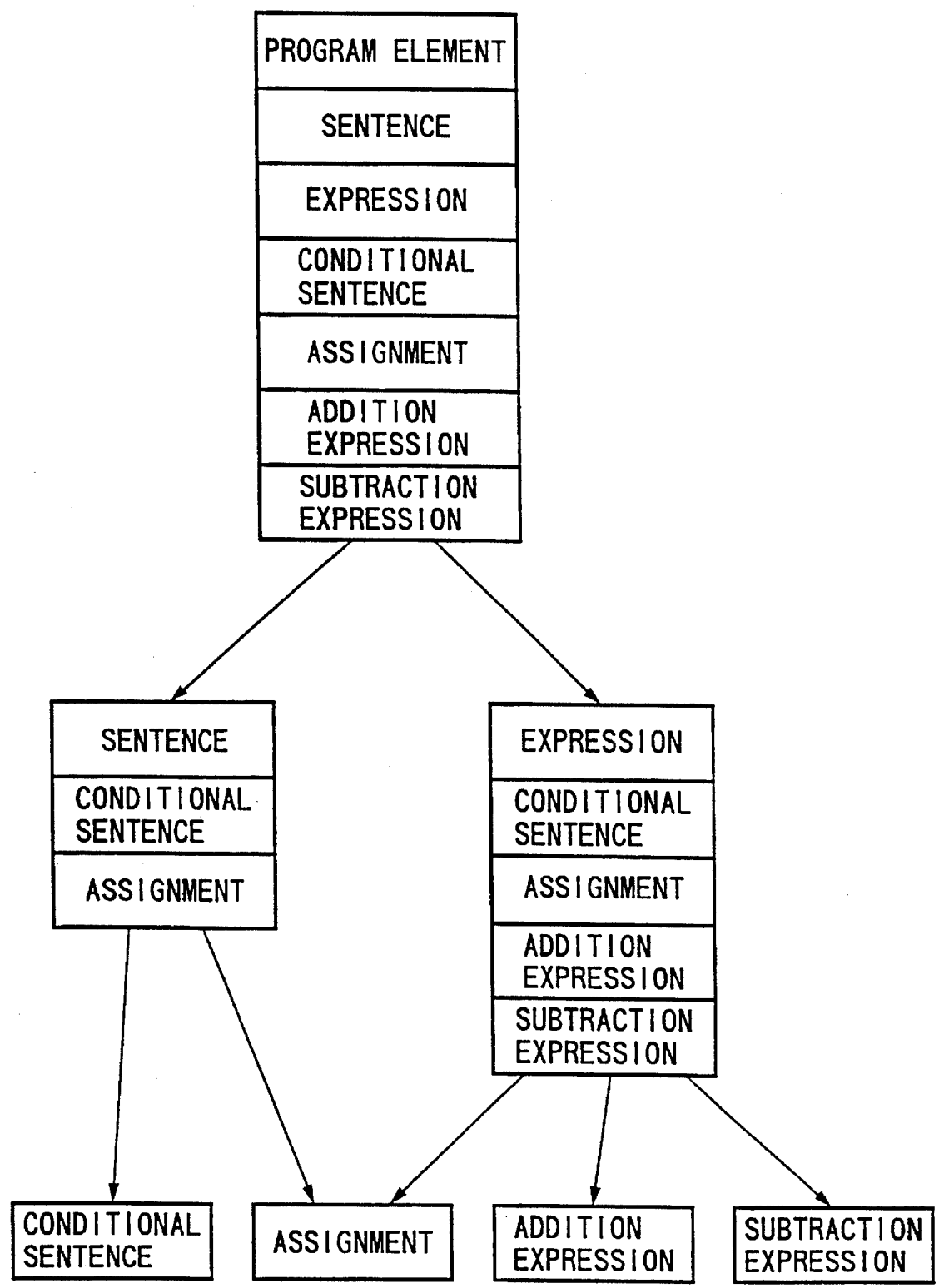
FIG. 15 is a diagram to show subsets of power set corresponding to the sort hierarchical in FIG. 11.

The elements of the set Lowers are in partial order relation depending on inclusion. This hierarchy defined by the partial order relation keeps the original sort hierarchy defined by Sorts. When the sort hierarchy given in FIG. 12 is Sorts, its Lowers is as shown in FIG. 14. The structure of the sort hierarchy Sorts is in one-to-one correspondence with the structure given by Lowers. Further, the set Lowers shown in FIG. 14 is a subset of the power set P(Sorts) of the sorts as shown in FIG. 13. All elements of Lowers are elements of P(Sorts), and the order relation of elements on Lowers is kept for P(Sorts). Thus, the form matching on the sort hierarchy Sorts can be also applied to the form matching on the power set P(Sorts) of Sorts.

Thus, in this embodiment, structure forms used with the lattice expandable form processing means 108 described in detail in FIG. 9 are considered as elements of the power set P(Sorts) of Sorts, which is the sort hierarchy. In FIG. 16, the structure form obtaining procedure, which is a subroutine of the lattice expandable form processing means 108 judges whether the input structure is a variable or not. If the structure is a variable, the structure form is obtained in step 1604. In this embodiment, a structure as a variable should have a structure form as an attribute of the variable. In Step 1604, by obtaining the attribute representing the structure form from the structure, which is a variable, the structure form of the variable is obtained. If the structure is not a variable, the sort which the structure belongs to based on the functor name and the functor name definition in Step 1602. In Step 1603, using sort names obtained in Step 1602, the structure form is obtained using the function Lower to obtain Lowers from Sorts. This function Lower to obtain Lowers from Sorts can be defined as follows:

$$\text{Lower}(s) = \{x | x \in \text{Sorts}, x \leq s\}$$

The structure form obtaining procedure returns the structure form determined in Step 1603 or Step 1604.

Figure 17:
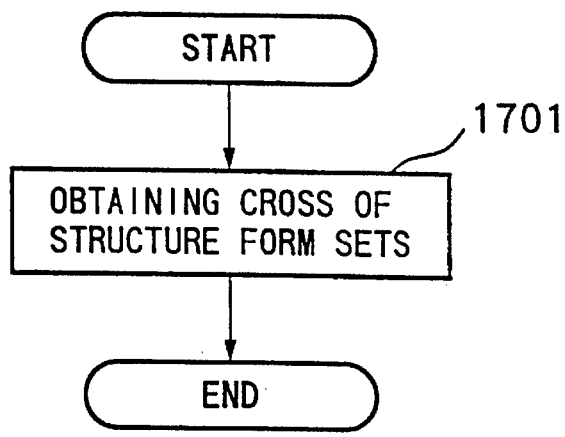
FIG. 17 is a flowchart to illustrate the operation of the crossing structure form obtaining procedure, which is a subroutine of the lattice expandable processing means 108.

FIG. 17 is a flowchart to illustrate the operation of the procedure to obtain the crossing structure form, which is a subroutine of the lattice expandable form processing means 108. As described above, a structure form is an element of the power set P(Sorts) of the sort hierarchical Sorts. Among the structure forms, operation corresponding to the intersection of the sets can be defined. In Step 1701, intersection of two structure forms is operated and the obtained structure form is treated as the returned value of the crossing structure form obtaining procedure. If this returned value is an empty set, the two structure forms are judged unmatching in Step 904.

Figure 18:
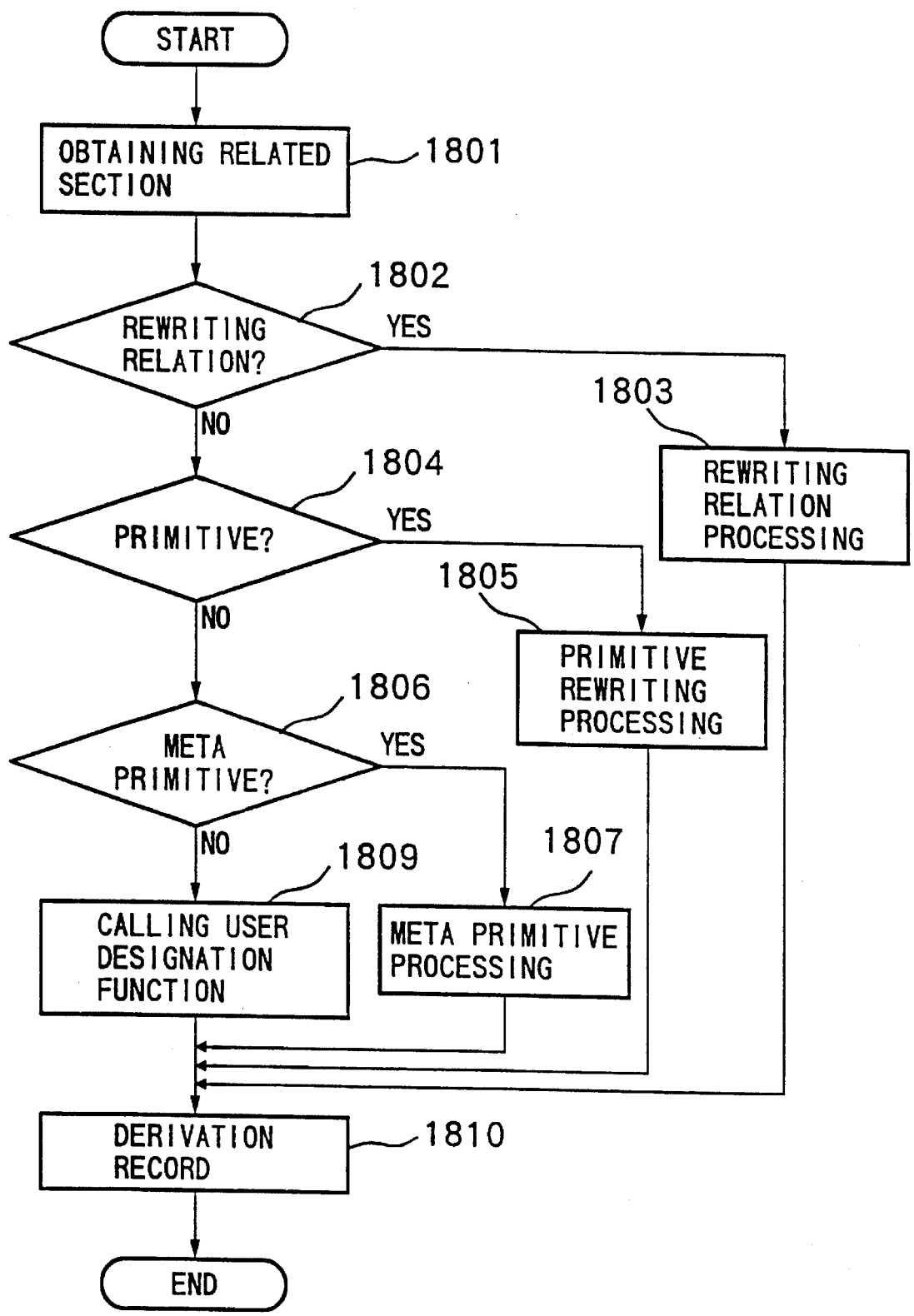
FIG. 18 is a flowchart to illustrate the operation of the specification conversion means 109.

FIG. 18 is a flowchart to illustrate the operation of the specification conversion means 109. The specification conversion means 109 inputs the partial specification, applied design knowledge 120 and the unifier from the legitimate check means 107. In Step 1801, the relation indication contained in the relation section 121 of the applied design knowledge 120 is obtained first. Then, in Step 1802, it is judged whether the relation indication is "rewriting relation" or not. If the relation indication is rewriting relation, the rewrite relation processing means 110 is activated in Step 1803 so that the input partial specification is converted. If the relation indication is not "rewriting relation", it is judged whether the relation indication is "primitive" or not in Step 1804. If it is "primitive", the primitive rewrite processing means 111 is activated for conversion of the input partial specification in Step 1805. If the relation indication is not "primitive", it is judged whether the relation indication is "meta primitive" in Step 1806. If the relation indication is "meta primitive", the meta primitive processing means 112 is activated in Step 1807 so that the input partial specification is converted. If the relation indication is not "meta primitive", the relation indication is treated as a function designated by the user and the partial specification, applied design knowledge 120 and the unifier are passed to the function for conversion in Step 1809.

Next, in Step 1810, the derivation recording means 115 is activated treating the partial specification, applied design knowledge 120, unifier, conversion data and partial specification after conversion as arguments. Finally, the partial specification after conversion is returned to the legitimate check means 107 to terminate the procedure.

Figure 19:
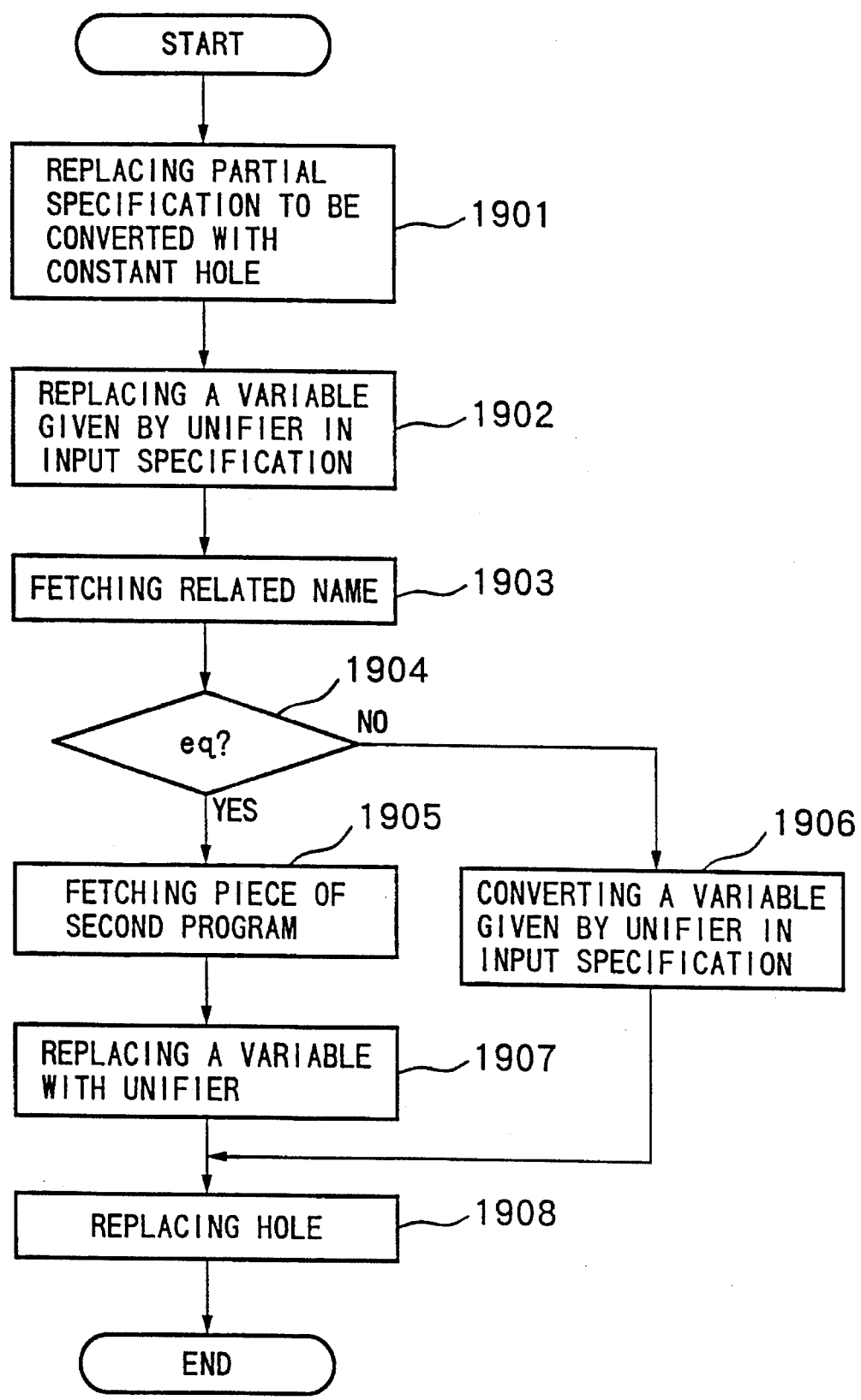
FIG. 19 is a flowchart to illustrate the operation of the rewrite relation processing means 110.

FIG. 19 is a flowchart to illustrate the operation of the rewrite relation processing means 110. The rewrite relation processing means 110 receives the partial specification to be converted, applied design knowledge 120 and the unifier. Firstly, in Step 1901, the sub tree corresponding to the received partial specification in the input specification 117 is replaced with "hole", which is a special constant. In Step 1902, input specification 117 and received unifier are given to the unifier processing for replacement of the variables given by the unifier in the input specifications. In Step 1903, the relation indication is fetched from the relation section 121 of the received design knowledge 120. In Step 1904, it is judged whether the relation indication is "eq" or not. In this embodiment, "eq" is provided as the relation indication to represent the rewriting relation. Design knowledge with the relation section 121 containing the relation indication "eq" has two program pieces 122. When the relation indication is "eq", the second program piece 122 of the received design knowledge 120 is taken out in Step 1905.

Then, in Step 1907, the second program piece 122 and the received unifier are given to the unifier processing for replacement of the variables given by the unifier in the input specification. When the relation indication is not "eq", the received partial specification and received unifier are given to the unifier processing in Step 1906 for replacement of the variables given by the unifier in the input specification. In Step 1908, the constant "hole" in the input specification 117 created in Step 1901 is replaced with the structure after unifier processing in Step 1907 or 1906. Then in Step 1908, the input specification after conversion is returned, which terminates the procedure.

Figure 20:
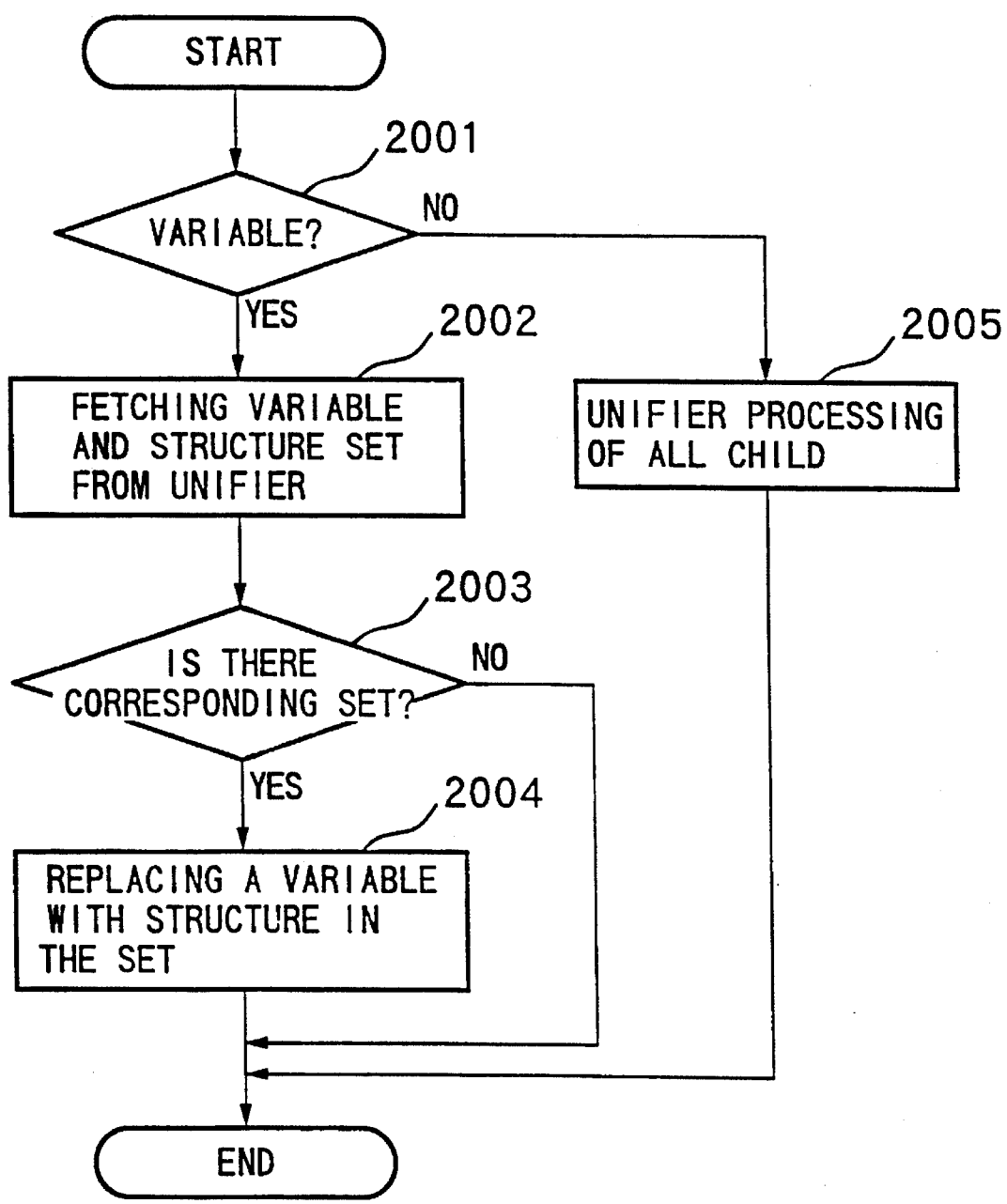
FIG. 20 is a flowchart to illustrate the operation of unifier processing, which is a subroutine of the rewrite relation processing means.

FIG. 20 is a flowchart to illustrate the operation of the unifier processing, which is a subroutine of the rewrite relation processing means 110.

Firstly in Step 2001, it is judged whether or not the received structure is a variable. If it is a variable, a pair corresponding to the variable is taken out of the received unifier in Step 2002. For example, if the unifier is <<variable X, structure A>, <variable Y, structure B>>, the pair corresponding to the variable Y is <variable Y, structure B>. There is no pair corresponding to variable Z. In Step 2003, it is checked whether or not a corresponding pair was found in Step 2002. If a corresponding pair exists, the variable is replaced with the structure of the corresponding pair in Step 2004. For example, if the received structure is variable X and the received unifier is <<variable X, structure A>, <variable Y, structure B>>, the structure A is returned instead of the variable X. If there is no corresponding pair, the received variable is returned as it is.

For example, the received structure is variable Z and the received unifier is <<variable X, structure A>, <variable Y, structure B>>, the variable Z is the returned value. When the received structure is not a variable, the structure has a format "functor name (child structure, . . . , child structure m)". In such a case, all child structures are subjected to unifier processing in Step 2005. Suppose unifier processing of the structure A results in "Unif (structure A)". In Step 2005, "Functor name (Unif (child structure 1), . . . , Unif (Child structure m))" is obtained and returned.

Figure 21:
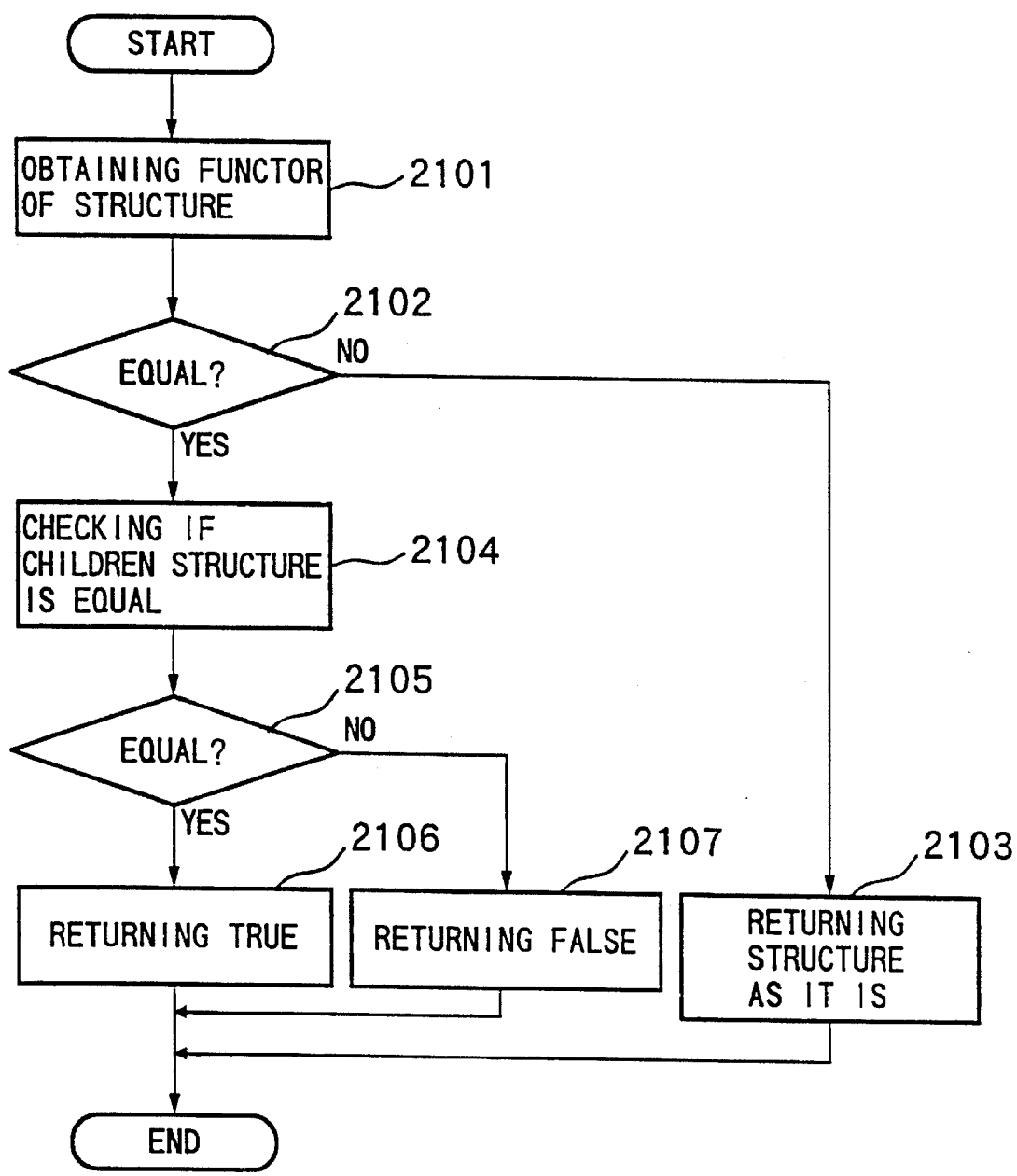
FIG. 21 is a flowchart to illustrate the operation of the primitive rewrite processing means 111.

FIG. 21 is a flowchart to illustrate the operation of the primitive rewrite processing means 111. The primitive rewrite processing means 111 rewrites the partial specification using the primitive conversion knowledge peculiar to the system when the applied design knowledge 120 has a relation section 121 indicating "primitive relation". In this embodiment, "equal" is provided as the primitive conversion knowledge proper to the system.

Firstly, in Step 2101, a functor for the received structure is obtained. Then it is judged whether or not the functor name is "equal" in Step 2102. If not, the received structure is returned as it is in Step 2103. If it is "equal", it is judged whether the child structures of the received structure are equivalent or not in Step 2104, and the result is checked in Step 2105. If they are equivalent, the structure "TRUE ( )" is returned in Step 2106. If they are not equivalent, the structure "FALSE ( )" is returned in Step 2107.

This primitive rewrite processing means 111 enables description of the design knowledge 120 as follows:

Rel.eq IF (TRUE, X, Y)→X.

Rel.eq IF (FALSE, X, Y)→Y.

Rel. prim equal (X, Y)→.

Rel. eq not (TRUE)→FALSE.

Rel. eq not (FALSE)→TRUE.

Rel. eq if (X==Y)Z;→IF (equal (X, Y), Z,).

Thus, equivalence relation of structures can be treated as design knowledge 120.

Figure 22:
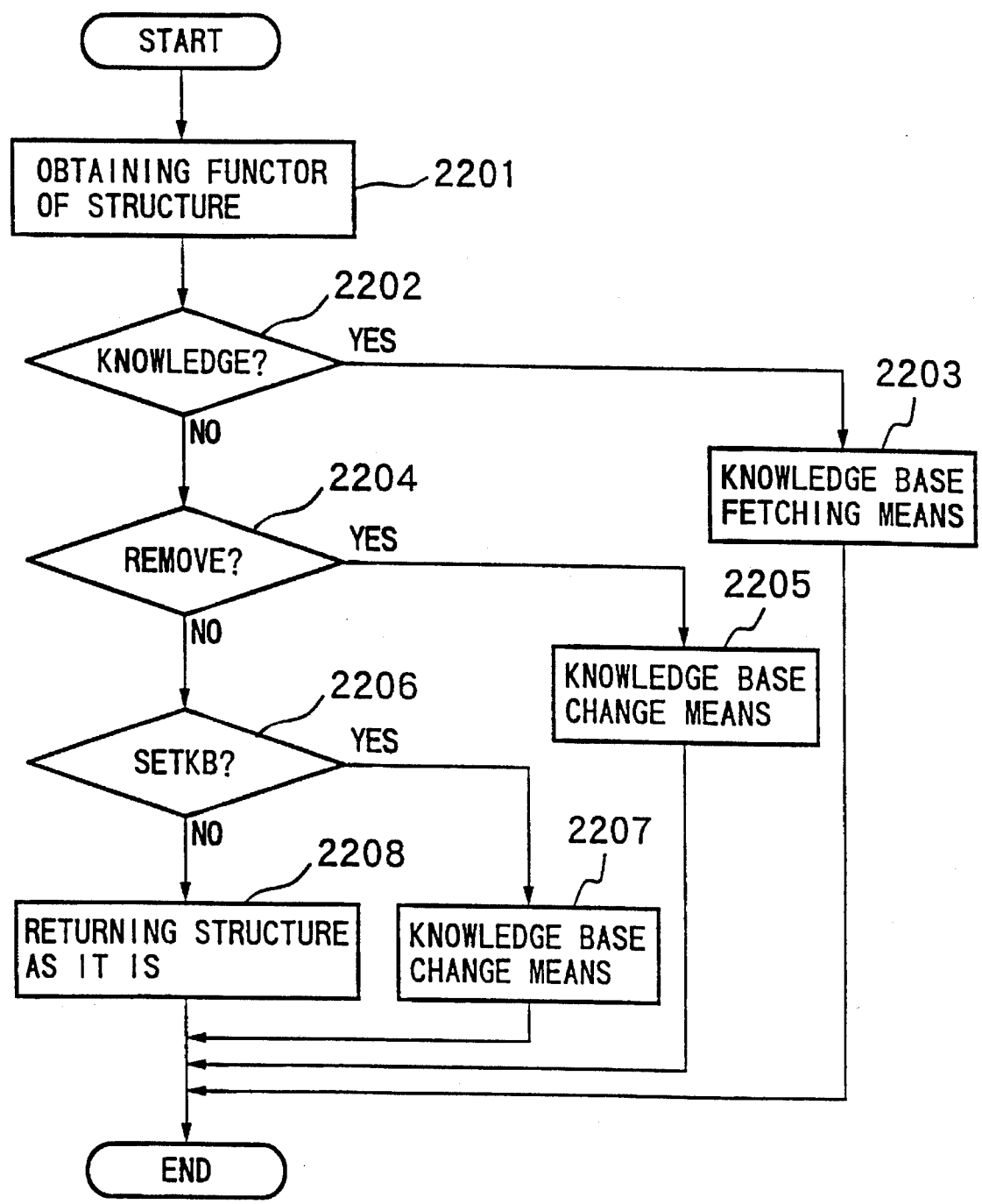
FIG. 22 is a flowchart to illustrate the operation of the meta primitive processing means 112.

FIG. 22 is a flowchart to illustrate the operation of the meta primitive processing means 112. In this embodiment, "knowledge", "remove", and "setkb" are prepared as meta primitives. In Step 2201, the functor name of the received structure is obtained. Then, in Step 2202, it is judged whether or not the functor name is "knowledge". If the functor name is "knowledge", then the knowledge base fetching means 113 is activated in Step 2203. If the functor name is not "knowledge", it is judged whether or not the functor name is "remove" in Step 2204. If the functor name is "remove", the knowledge base changing means 114 is activated as "remove" in Step 2205. If the functor name is not "remove", it is Judged whether or not the functor name is "setkb". If the functor name is "setkb", the knowledge base changing means 114 is activated as "setkb" in Step 2207. If the functor name is not "setkb", the structure is returned as it is in Step 2208.

Figure 23:
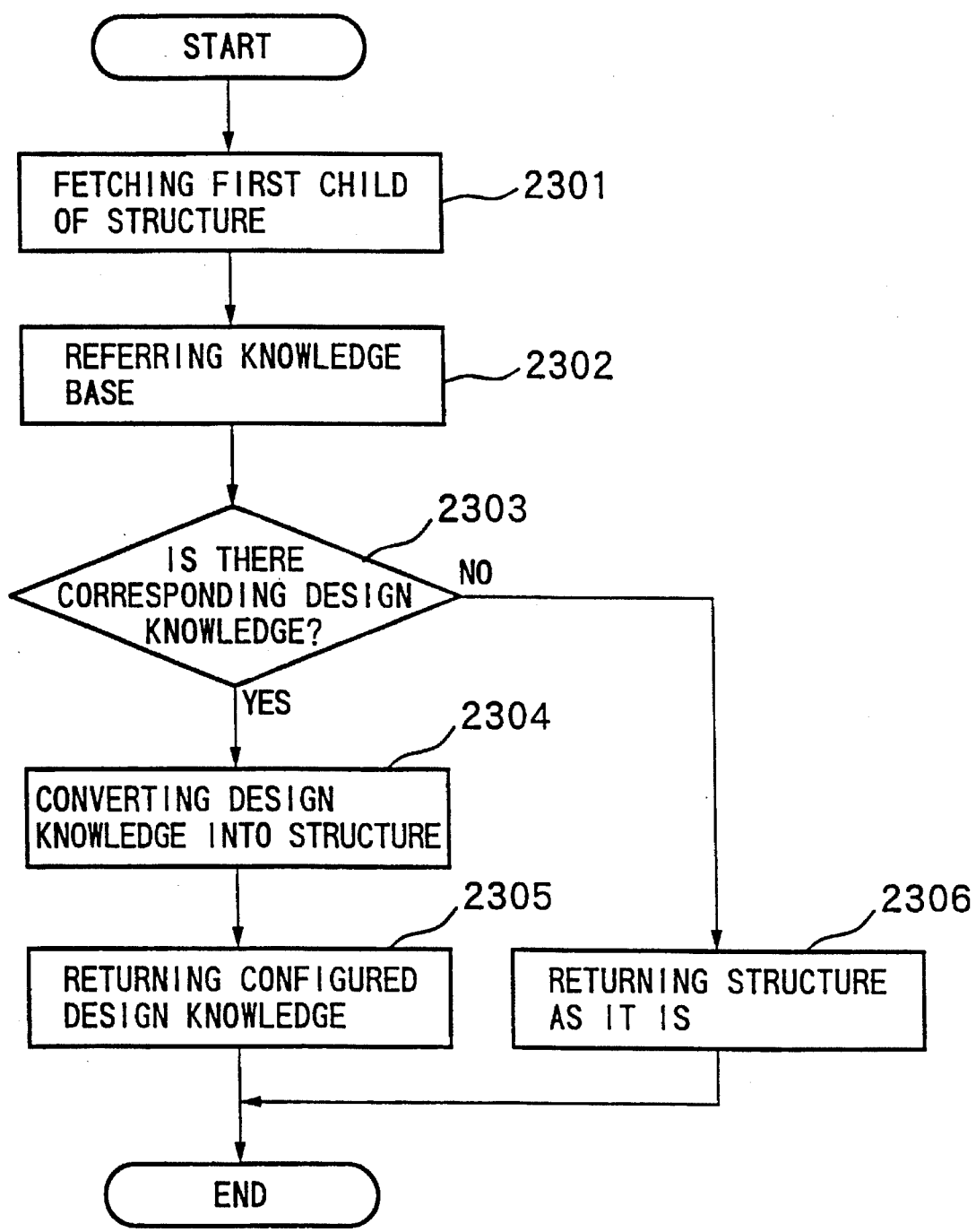
FIG. 23 is a flowchart to illustrate the operation of the knowledge base fetching means 113.

FIG. 23 is a flowchart to illustrate the operation of the knowledge base fetching means 113. The structure received by the knowledge base fetching means 113 is "knowledge (child structure)". In Step 2301, the child structure of the received structure is fetched. Then, in Step 2302, one design knowledge 120 having the same structure as the child structure fetched above as the first program piece 122 (corresponding knowledge) is taken out. Next, in Step 2303, it is judged whether or not a corresponding design knowledge 120 was found in the above step. If a corresponding design knowledge 120 was found, a functor corresponding to the relation indication is generated from the relation section 121 of the taken out design knowledge 120 in Step 2304. A structure comprising this functor name and all program pieces 122 of the design knowledge 120 is created. In Step 2305, a structure created in Step 2304 is returned to the meta primitive processing means 112 as the result of the knowledge base fetching means 113. If any corresponding design knowledge 120 was not found, the structure received in Step 2306 is returned as it is to the meta primitive processing means 112.

Figure 24:
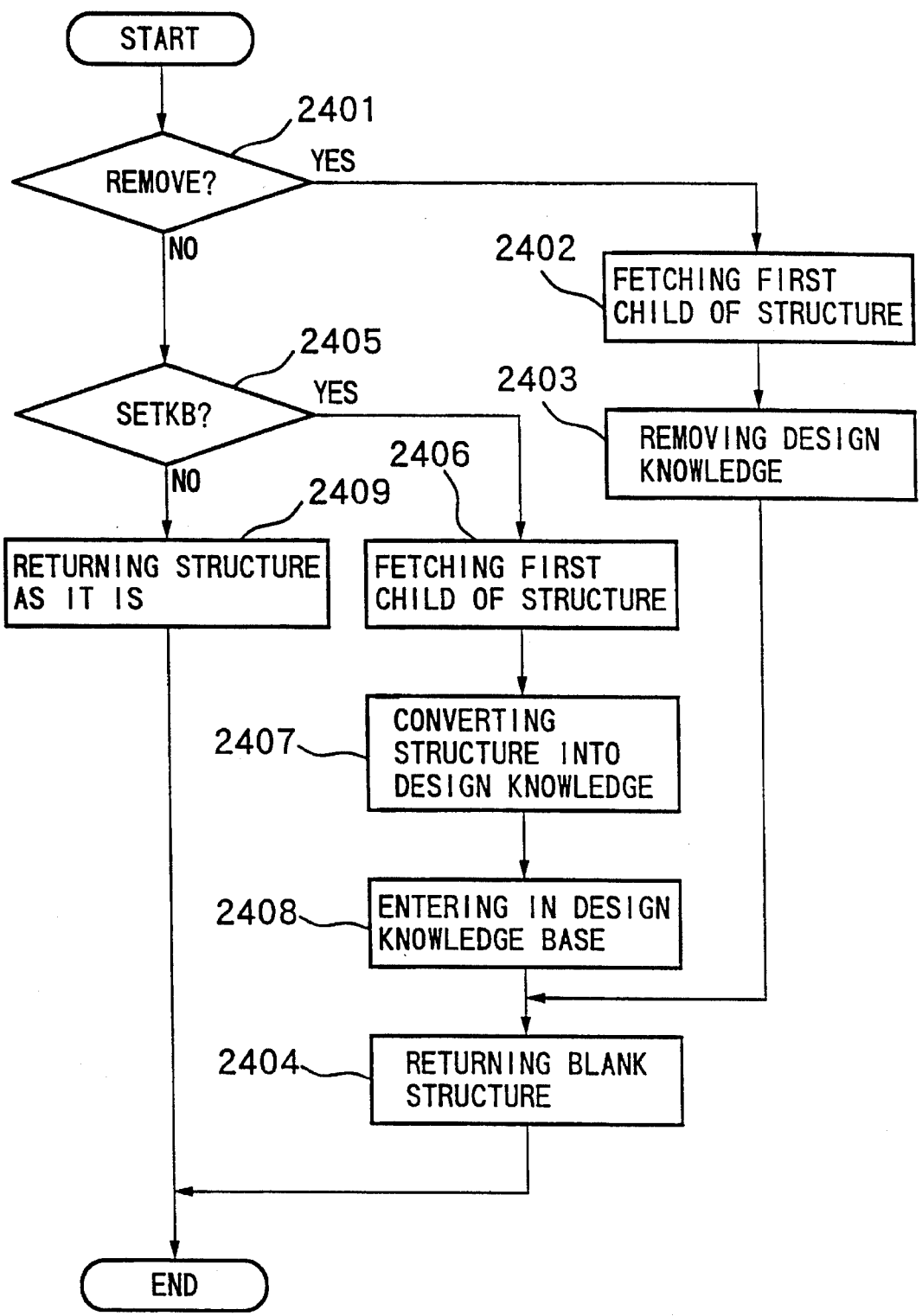
FIG. 24 is a flowchart to illustrate the processing of the knowledge base changing means 114.

FIG. 24 is a flowchart to illustrate the operation of the knowledge base changing means 114. In Step 2401, it is judged whether or not the operation was invoked by the meta primitive processing means 112 as "remove". If it was invoked as "remove", the received structure has the format "remove (partial structure)". This partial structure is fetched out of the structure in Step 2402. Then, in Step 2403, every design knowledge 120 having a program piece 122 matching with the fetched partial structure as the first program piece 122 is removed from the design knowledge base 119 in Step 2403. After that, in Step 2404, a blank structure is returned. If the operation was not invoked as "remove", it is judged whether it was invoked by the meta primitive processing means 112 as "setkb" in Step 2405. If it was invoked as "setkb", then the received structure has the format "setkb (partial structure)". This partial structure is fetched out of the structure in Step 2406. In Step 2407, the functor name of the fetched partial structure is converted to a corresponding relation indication and the design knowledge 120 is generated based on this relation indication and the child structure of the partial structure. Next, in Step 2408, the generated design knowledge 120 is registered to the design knowledge base 119. After that, in Step 2404, a blank structure is returned. If the operation was not invoked by either "remove" or "setkb", then the received structure is returned as it is in Step 2409.

The derivation recording means 115 and the design process report means 116 are now described. The derivation recording means 115 is invoked by the specification conversion means 109 and records a group of partial specification, applied design knowledge 120, unifier, type of conversion used by the specification conversion means 109, and the partial specification after conversion to the program derivation 123. The design process report means 116 can be activated after termination of specification conversion process. It refers to the program derivation 123 generated by the derivation recording means 115 and outputs the design process report 124 edited according to the conversion type to show the progress of design processes.

With an automatic program generation system of the present invention as described above, the following effects can be obtained:

1) Generation of pairs of partial specification and the design knowledge for detailing the partial specification one by one prevents excessive generation of applicable pairs.

2) The design split means allows the system to split the area as the subject of design before designing. This means that the system does not have to search the entire specification when retrieving partial specifications, which results in considerable reduction in searching time. 3) In the form checking for variables from partial specification and design knowledge, the lattice expandable form processing means allows correct judgment. Form checking on the lattice structure comprising forms obtained from the hierarchy enables correct acceptance of the pairs which were unreasonably judged unmatching by conventional method, when they can be considered matching in later matching.

4) The primitive rewrite processing means allows introduction of primitive relation and equivalency judgment for partial specifications as primitive. This enables rewriting with recognizing difference in structures of specifications.

5) Capability to handle knowledge in the design knowledge base during automatic program generation process allows fetching of design knowledge contained in the input specification for later use in design detailing process. 6) New knowledge can be added to and design knowledge can be deleted from the design knowledge base during automatic program generation process. This capability can be utilized to obtain partial data from the input specification for later use in design detailing process and to prevent the design knowledge base from becoming too complicated by disabling certain design knowledge during design processes.

7) Derivation recording means and the design process report means enables recording of selected partial specification and design knowledge during automatic program generation process. This enables detection of incorrect contents in the knowledge base and errors in input specification when the result program is not satisfactory.

Obviously many modifications and variations of the present invention are possible. It is intended to cover in the appended claims all such modifications as fall within the true spirit and scope of the invention.

What is claimed is:

1. A computer-implemented automatic program generation system to generate a target program by recursive conversion of a program specification comprising:

(a) a specification input means for inputting the specification and for converting the specification into syntactic tree format, and for outputting the specification in syntactic tree format, (b) a design control means, responsive to the specification in syntactic tree format, for recursively converting the specification in syntactic tree format obtained by said specification input means, and responsive to an inconvertible specification notice, outputting the converted specification as a target program, (c) a design knowledge base comprising an accumulated plurality of design knowledge data, each design knowledge datum including (1) a plurality of program pieces and (2) a relation section indicating a relation between the plurality of program pieces including a primitive relation, a meta primitive relation and a rewriting relation, (d) a design knowledge selection means, invoked by the design control means, for selecting a one of the design knowledge data in the design knowledge base applicable to a partial specification to be converted, and, responsive to a no match notice, transmitting the inconvertible program notice to said design control means, the design control means converting the input specification by invoking the design knowledge selection means, (e) a legitimate check means, responsive to the one of the design knowledge data from the design knowledge selection means, for judging whether there is a match between the partial specification to be converted and the one of the design knowledge data selected by said design knowledge selection means, for outputting the partial specification and the one of the design knowledge data when there is the match, and, when there is not a match, for transmitting the no match notice to said design knowledge selection means, and (f) a specification conversion means, responsive to the partial specification and the one of the design knowledge data from the legitimate check means, for selecting and invoking one of a specification conversion processing means based on the partial specification and the one of the design knowledge data output from said legitimate check means, said specification conversion processing means including a rewrite relation processing means selected by said specification conversion means when the relation section of the one of the design knowledge data indicates the rewriting relation, for rewriting the partial specification in the syntactic tree format according to said one of the design knowledge data.

2. An automatic program generation system of claim 1, further comprising:

a design split means responsive to said design control means, for judging whether a root node of the syntactic tree representing the specification is rewritable using said design knowledge base, splitting the specification into sub trees when the specification is not rewritable and inputting each of the sub trees into said design control means as a specification, wherein the design control means passes the converted specification to the design split means.

3. An automatic program generation system of claim 1, further comprising:

a lattice expandable form processing means, responsive to said legitimate check means, for mapping a form of the partial specification and a form of the program piece of the one of the design knowledge data on a space of lattice introduced from a form hierarchy, for judging whether the partial specification and the one of the design knowledge data match and for determining a form for the variables, wherein the legitimate check means invokes the lattice expandable form processing means to perform said judging.

4. An automatic program generation system of claim 1, said specification conversion processing means further including a primitive rewrite processing means, selected by said specification conversion means when the relation section of the one of the design knowledge data indicates the primitive relation, for rewriting the partial specification using a primitive conversion.

5. An automatic program generation system of claim 1, said specification conversion processing means further including a meta primitive processing means for processing the meta primitive, selected by said specification conversion means when the relation section of the one of the design knowledge data indicates the meta primitive relation; and a knowledge base fetching means, responsive to said meta primitive processing means, for fetching a portion of said design knowledge base corresponding to said specification.

6. An automatic program generation system of claim 1, said specification conversion processing means further including a meta primitive processing means for processing the meta primitive selected by said specification conversion means when the relation section of the one of the design knowledge data indicates the meta primitive relation; and a knowledge base changing means, responsive to said meta primitive processing means, for adding an other of the design knowledge datum described in said specification to said design knowledge base and for deleting the design knowledge datum matching the program pieces described in said specification in syntactic tree format from said design knowledge base.

7. An automatic program generation system of claim 1, further comprising:

a derivation recording means, invoked by said specification conversion means after said specification conversion means invokes one of the specification conversion processing means, for recording the partial specification, the one of the design knowledge data and the partial specification after conversion as history data, and a design process report means, invoked by said specification conversion means after said specification conversion means invokes one of the specification conversion processing means, for referring to the history data recorded by said derivation recording means and outputting the history data.

8. An automatic program generation system of claim 1, further comprising:

a design split means responsive to said design control means, for judging whether a root node of the syntactic tree representing the specification is rewritable using said design knowledge base, splitting the specification into sub trees when the specification is not rewritable, and inputting each of the sub trees into said design control means as a specification, wherein the design control means passes the converted specification to the design split means; and a lattice expandable form processing means, responsive to said legitimate check means, for mapping a form of the partial specification and a form of the program piece of the one of the design knowledge data on a space of lattice comprising forms introduced from a form hierarchy, for judging whether the partial specification and the one of the design knowledge data match and for determining a form of variables, wherein the legitimate check means invokes the lattice expandable form processing means to perform said judging.

9. An automatic program generation system of claim 1, further comprising:

a lattice expandable form processing means, responsive to said legitimate check means, for mapping a form of the partial specification and a form of the program piece of the one of the design knowledge data on a space of lattice comprising forms introduced from a form hierarchy, for judging whether the partial specification and the one of the design knowledge data match and for determining a form of variables, wherein the legitimate check means invokes the lattice expandable form processing means to perform said judging; and wherein said specification conversion processing means further includes a primitive rewrite processing means, selected by said specification conversion means when the relation section of the one of the design knowledge data indicates the primitive relation, for rewriting the partial specification using a primitive conversion.

10. An automatic program generation system of claim 1, further comprising:

a design split means, responsive to said design control means, for judging whether a root node of the syntactic tree representing the specification is rewritable using said design knowledge base, splitting the specification into sub trees when the specification is not rewritable, and activating said design control means for each of the sub trees; and said specification conversion processing means further including a primitive rewrite processing means, selected by said specification conversion means when the relation section of the one of the design knowledge data indicates the primitive relation for rewriting the partial specification using a primitive conversion.

11. A computer implemented automatic program generation system to generate a target program by recursive conversion of a program specification, comprising:

(a) a specification input means for inputting the specification and converting the specification into syntactic tree format, and for outputting the specification in syntactic tree format;

(b) a design control means, responsive to the specification in syntactic tree format, for recursively converting the specification in syntactic tree format obtained by said specification input means, and responsive to an inconvertible specification notice, outputting the converted specification as a target program;

(c) a design knowledge base comprising an accumulated plurality of design knowledge data, each design knowledge datum including (1) a plurality of program pieces and (2) a relation section indicating a mutual relation between the plurality of program pieces including a primitive relation, a meta primitive relation, and a rewriting relation;

(d) a design split means, responsive to said design control means, for judging whether a root node of the syntactic tree representing the specification is rewritable using said design knowledge base, splitting the specification into sub trees when the specification is not rewritable and activating said design control means for each of the sub trees;

(e) a design knowledge selection means, invoked by the design control means, for selecting and transmitting a one of the design knowledge data in the design knowledge base applicable to a partial specification to be converted, from said design knowledge base, the design control means converting the input specification by invoking the design knowledge selection means;

(f) a legitimate check means, responsive to the one of the design knowledge data from the design knowledge selection means, for judging whether there is a match between the partial specification to be converted and the one of the design knowledge data selected by said design knowledge selection means, and if there is a match, for outputting the partial specification and the one of the design knowledge data;

(g) a lattice expandable form processing means, responsive to said legitimate check means, for mapping a form of the partial specification and a form of the program piece of the one of the design knowledge data on a space of lattice comprising forms introduced from a form hierarchy, and for determining a form of variables, wherein the legitimate check means invokes the lattice expandable form processing means to perform said judging;

(h) a specification conversion means, responsive to the partial specification and the one of the design knowledge data from the legitimate check means, for selecting and invoking one of a specification conversion processing means based on the partial specification and the one of the design knowledge data output by said legitimate check means, said specification conversion processing means including:

(1) a rewrite relation processing means, selected by said specification conversion means when the relation section of the one of the design knowledge data indicates the rewriting relation, for rewriting the partial specification in the syntactic tree format according to said one of the design knowledge data;

(2) a primitive rewrite processing means, selected by said specification conversion means when the relation section of the one of the design knowledge data indicates the primitive relation, for rewriting the partial specification by using a primitive conversion;

(3) a meta primitive processing means for processing a meta primitive, selected by said specification conversion means when the relation section of the one of the design knowledge data indicates the meta primitive relation;

(i) a knowledge base fetching means, invoked by said meta primitive processing means, for fetching a portion of said design knowledge base corresponding to said specification in syntactic tree format;

(j) a knowledge base changing means, responsive to said meta primitive processing means, for adding another of the design knowledge datum described in said specification to said design knowledge base and for deleting the design knowledge datum matching the program pieces described in said specification from said design knowledge base;

(k) a derivation recording means, invoked by said specification conversion means after said specification conversion means invokes one of the specification conversion processing means, for recording the partial specification, the one of the design knowledge data and the partial specification after conversion as history data; and (l) a design process report means, invoked by said specification conversion means after said specification conversion means invokes one of the specification conversion processing means, for referring to the history data recorded by said derivation recording means and outputting the history data.

\* \* \* \* \*